(12) United States Patent
Mendell

(10) Patent No.: US 11,487,792 B1
(45) Date of Patent: Nov. 1, 2022

(54) SYSTEMS AND METHODS FOR CONTROLLING AND MODIFYING ACCESS PERMISSIONS FOR PRIVATE DATA OBJECTS

(71) Applicant: DraftKings, Inc., Boston, MA (US)

(72) Inventor: Jordan Mendell, Boca Raton, FL (US)

(73) Assignee: DraftKings, Inc., Boston, MA (US)

( * ) Notice: Subject to any disclaimer, the term of this patent is extended or adjusted under 35 U.S.C. 154(b) by 0 days.

(21) Appl. No.: 17/725,193

(22) Filed: Apr. 20, 2022

Related U.S. Application Data

(60) Provisional application No. 63/219,550, filed on Jul. 8, 2021.

(51) Int. Cl.
*G06F 16/28* (2019.01)
*G06F 16/24* (2019.01)
*G06F 16/2458* (2019.01)

(52) U.S. Cl.
CPC ........ *G06F 16/288* (2019.01); *G06F 16/2477* (2019.01); *G06F 16/285* (2019.01)

(58) Field of Classification Search
CPC ... G06F 16/288; G06F 16/285; G06F 16/2477
See application file for complete search history.

(56) References Cited

U.S. PATENT DOCUMENTS

| | | | |
|---|---|---|---|
| 8,392,420 B2 * | 3/2013 | Mellmer | G06F 21/604 707/740 |
| 8,752,138 B1 | 6/2014 | Bennett et al. | |
| 8,868,560 B2 * | 10/2014 | Spivack | G06Q 30/0273 706/55 |
| 9,460,300 B1 | 10/2016 | Kissner et al. | |
| 2014/0281890 A1 * | 9/2014 | D'Angelo | G06F 16/285 707/736 |

(Continued)

FOREIGN PATENT DOCUMENTS

EP   3 502 927 A1   6/2019

OTHER PUBLICATIONS

Jindong, Zhao, Liang Zhenjun, and Zhao Yaopei. "ELHFR: A graph routing in industrial wireless mesh network." 2009 International Conference on Information and Automation. IEEE, 2009. (Year: 2009).*

(Continued)

*Primary Examiner* — Mohsen Almani
(74) *Attorney, Agent, or Firm* — Foley & Lardner LLP

(57) ABSTRACT

The present disclosure provides systems and methods for modifying and controlling access to private data objects. A system can maintain a node graph comprising nodes that each maintains an association with one or more neighbor nodes. The system can maintain private data objects that are generated based on a request from an organizer node, and include a list of authorized nodes and a setting to enable neighbors of authorized nodes to request inclusion in the list of authorized nodes. The system can receive a request for private data objects from a first node, and identify private data objects that include one or more neighbor nodes of the first node. The system can present a list of private data objects to the first node, and add the first node to the list of authorized nodes of the private data object subsequent to receiving a request from the first node.

20 Claims, 8 Drawing Sheets

(56) References Cited

U.S. PATENT DOCUMENTS

2020/0004759 A1* 1/2020 Brebner .................. G06F 8/10

OTHER PUBLICATIONS

Marwick, Miriam S., Corinne M. Kramer, and Evan J. Laprade. Analysis of soldier radio waveform performance in operational test. Institute for Defense Analyses Alexandria VA Alexandria, 2015. (Year: 2015).*

Alfieri R, Cecchini R, Ciaschini V, Gianoli A, Spataro F, Bonnassieux F, Broadfoot P, Lowe G, Cornwall L, Jensen J, Kelsey D. Managing dynamic user communities in a grid of autonomous resources. arXiv preprint cs/0306004. May 30, 2003. (Year: 2003).*

Pereira, Anil L., Vineela Muppavarapu, and Soon Myoung Chung. "Role-based access control for grid database services using the community authorization service." IEEE Transactions on Dependable and Secure Computing 3.2 (2006): 156-166. (Year: 2006).*

International Search Report and Written Opinion for PCT Appl. No. PCT/US2022/025581 dated Jul. 15, 2022.

* cited by examiner

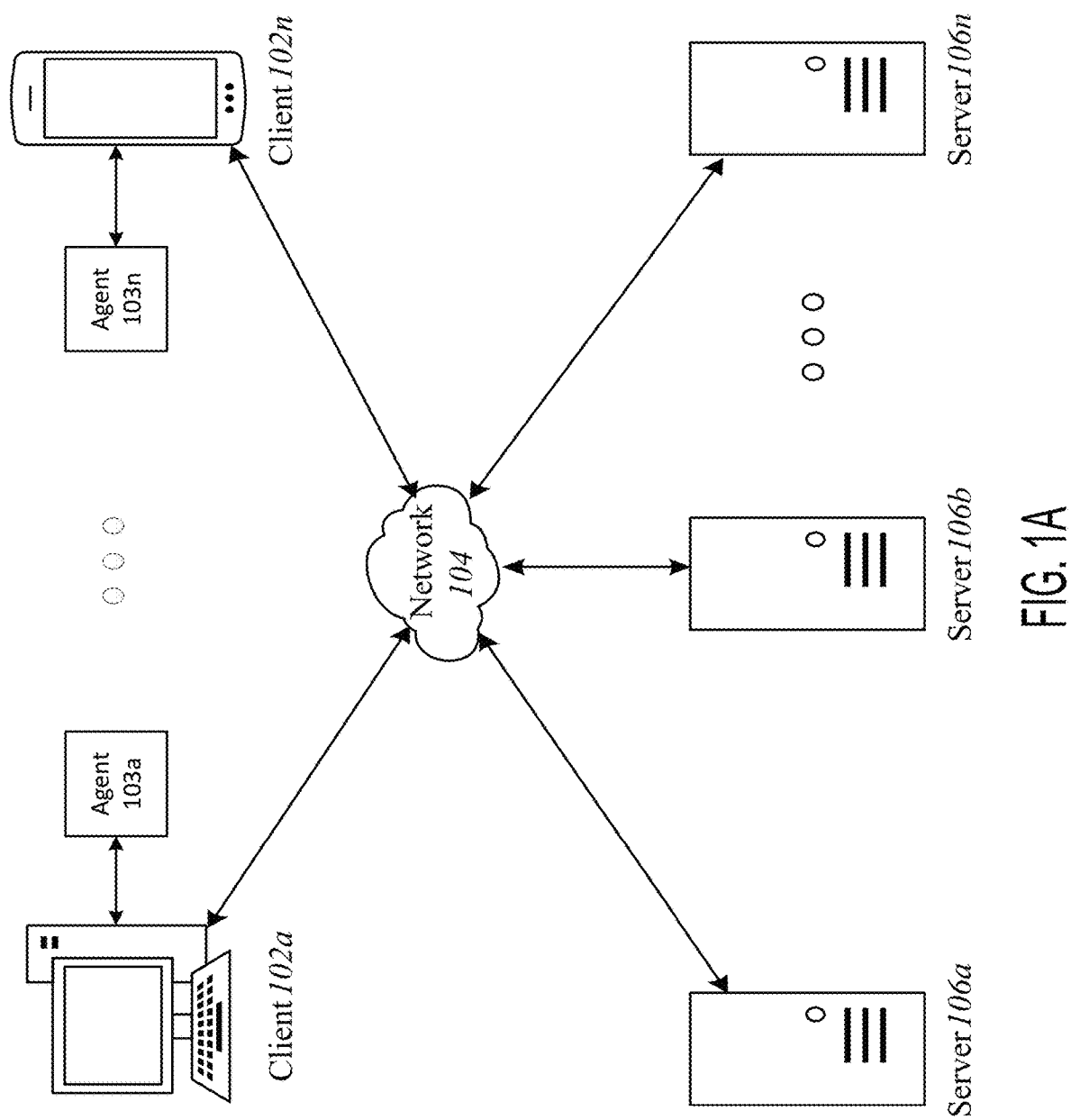

SYSTEMS AND METHODS FOR CONTROLLING AND MODIFYING ACCESS PERMISSIONS FOR PRIVATE DATA OBJECTS

CROSS-REFERENCE TO RELATED APPLICATIONS

The present application claims the benefit of and priority to U.S. Provisional Patent Application No. 63/219,550, filed on Jul. 8, 2021, the contents of which is incorporated herein by reference in its entirety for all purposes.

BACKGROUND

Data objects can be protected from unauthorized access by instantiating access permissions for such data objects. It can be challenging to organize access permissions for data objects when a particular number of accessing users is required, or if additional access by unknown users is encouraged subject to an approval process.

SUMMARY

It is therefore advantageous for a system to provide additional opportunities for data object managers, or organizers, to grant additional users access to protected or private data objects in response to requests. In conventional systems, permissions are granted on a one-to-one, or a group-to-group basis, where users, or predetermined groups of users, are granted explicit access to private data objects by an organizer of the private data object. In general, organizers of data objects can typically grant only those users to which they are associated access to the private data objects that the organizer creates or organizes. Although organizers may intend for more users to be exposed to private data objects, it would present a risk to security and privacy to allow every user on a computing or network system to view and access the private data objects of every organizer.

The systems and methods of this technical solution address these and other issues by providing techniques for requesting access to private data objects based on mutual associations in a node graph. Such functionality can allow users to request access to private data objects that other user profiles, such as those identified as neighboring nodes of the user in a node graph, are authorized to access. By allowing users to request authorization to access private data objects that their neighboring nodes are authorized to access, additional data access opportunities are provided to users without sacrificing the security and privacy of private data object organizers. In addition, by exposing private data object access opportunities to more users in a secure manner, the likelihood that processing requirements for a private data object will be satisfied, particularly for data objects that require association with a predetermined number of authorized users to satisfy processing requirements.

At least one aspect of the present disclosure is directed to a method. The method can be performed, for example, by one or more processors coupled to memory. The method can include maintaining a node graph comprising a plurality of nodes. Each node of the plurality of nodes can maintain an association with one or more neighbor nodes. The method can include maintaining a plurality of private data objects. Each private data object can be (i) generated in response to a request associated with an organizer node, (ii) can include a list of authorized nodes, and (iii) can include a setting to enable the one or more neighbor nodes of each of the list of authorized nodes to request inclusion in the list of authorized nodes. The method can include receiving, from a client device associated with a first node of the plurality of nodes, a request for private data objects. The method can include identifying, using the node graph, from the plurality of private data objects, a subset of private data objects that include, in the list of authorized nodes, at least one of the one or more neighbor nodes of the first node. The method can include generating, responsive to identifying the subset of private data objects, for each private data object of the subset of private data objects, a content item including an actionable object, which when actuated, causes the client device to transmit a request to include the first node in the list of authorized nodes of the private data object. The method can include presenting, to the client device, a list of private data objects comprising the content item for each private data object of the subset of private data objects. The method can include adding the first node to the list of authorized nodes of the private data object subsequent to receiving a request from the client device upon actuation of the actionable object corresponding to a private data object.

In some implementations, the method can include transmitting, to a second client device associated with the organizer node of the private data object, a join notification identifying the private data object, the first node, and the at least one of the one or more neighbor nodes of the first node. In some implementations, the method can include receiving, from the second client device, responsive to the join notification, an indication to allow the first node to access the private data object. In some implementations, adding the first node to the list of authorized nodes of the private data object is responsive to the indication to allow the first node to access the private data object. In some implementations, the indication to allow the first node to access the private data object comprises an indication to allow the first node to access a second subset of the plurality of private data objects. In some implementations, each private data object of the second subset of the plurality of private data objects can identify the organizer node as an organizer. In some implementations, the method can include authorizing the first node to access each private data object of the second subset of the plurality of private data objects.

In some implementations, the method can include generating the list of private data objects comprising the content item for each private data object of the subset of private data objects. In some implementations, the method can include sorting the list of private data objects based on a number of the one or more neighbor nodes of the first node that are included in the list of authorized nodes of each private data object in the list of private data objects. In some implementations, identifying the subset of private data objects further comprises filtering the plurality of private data objects based on a time period associated with each private data object of the plurality of private data objects. In some implementations, identifying the subset of private data objects further comprises filtering the plurality of private data objects by comparing a number of the plurality of nodes that are authorized to access each private data object of the plurality of private data objects to a predetermined number of authorized nodes of the private data object.

In some implementations, identifying the subset of private data objects is further based on a correspondence between attributes of each private data object of the subset of private data objects and the first node. In some implementations, the method can include determining that a predetermined number of authorized nodes of the private data object is satisfied at a time period associated with the private data object. In some implementations, the method can include initiating the private data object responsive to determining the predetermined number of authorized nodes is satisfied at the time period. In some implementations, the method can include determining that a predetermined number of authorized nodes of the private data object is not satisfied at a time period associated with the private data object. In some implementations, the method can include restricting the private data object from initiation responsive to determining the predetermined number of authorized nodes is not satisfied at the time period.

At least one other aspect of the present disclosure is directed to a system. The system can include one or more processors coupled to memory. The system can maintain a node graph comprising a plurality of nodes. Each node of the plurality of nodes can maintain an association with one or more neighbor nodes. The system can maintain a plurality of private data objects. Each private data object (i) can be generated in response to a request associated with an organizer node (ii) can include a list of authorized nodes, and (iii) can include a setting to enable the one or more neighbor nodes of each of the list of authorized nodes to request inclusion in the list of authorized nodes. The system can receive, from a client device associated with a first node of the plurality of nodes, a request for private data objects. The system can identify, using the node graph, from the plurality of private data objects, a subset of private data objects that include, in the list of authorized nodes, at least one of the one or more neighbor nodes of the first node. The system can generate, responsive to identifying the subset of private data objects, for each private data object of the subset of private data objects, a content item including an actionable object, which when actuated, causes the client device to transmit a request to include the first node in the list of authorized nodes of the private data object. The system can present, to the client device, a list of private data objects comprising the content item for each private data object of the subset of private data objects. The system can add the first node to the list of authorized nodes of the private data object subsequent to receiving a request from the client device upon actuation of the actionable object corresponding to a private data object.

In some implementations, the system can transmit, to a second client device associated with the organizer node of the private data object, a join notification identifying the private data object, the first node, and the at least one of the one or more neighbor nodes of the first node. In some implementations, the system can receive, from the second client device, responsive to the join notification, an indication to allow the first node to access the private data object. In some implementations, the system can add the first node to the list of authorized nodes of the private data object responsive to the indication to allow the first node to access the private data object. In some implementations, the indication to allow the first node to access the private data object comprises an indication to allow the first node to access a second subset of the plurality of private data objects. In some implementations, each private data object of the second subset of the plurality of private data objects identifying the organizer node as an organizer. In some implementations, the system can authorize the first node to access each private data object of the second subset of the plurality of private data objects.

In some implementations, the system can generate the list of private data objects comprising the content item for each private data object of the subset of private data objects. In some implementations, the system can sort the list of private data objects based on a number of the one or more neighbor nodes of the first node that are included in the list of authorized nodes of each private data object in the list of private data objects. In some implementations, the system can identify the subset of private data objects by performing operations comprising filtering the plurality of private data objects based on a time period associated with each private data object of the plurality of private data objects. In some implementations, the system can identify the subset of private data objects by performing operations comprising filtering the plurality of private data objects by comparing a number of the plurality of nodes that are authorized to access each private data object of the plurality of private data objects to a predetermined number of authorized nodes of the private data object.

In some implementations, the system can identify the subset of private data objects further based on a correspondence between attributes of each private data object of the subset of private data objects and the first node. In some implementations, the system can determine that a predetermined number of authorized nodes of the private data object is satisfied at a time period associated with the private data object. In some implementations, the system can initiate the private data object responsive to determining the predetermined number of authorized nodes is satisfied at the time period. In some implementations, the system can determine that a predetermined number of authorized nodes of the private data object is not satisfied at a time period associated with the private data object. In some implementations, the system can restrict the private data object from initiation responsive to determining the predetermined number of authorized nodes is not satisfied at the time period.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

DETAILED DESCRIPTION

Figure 1B:
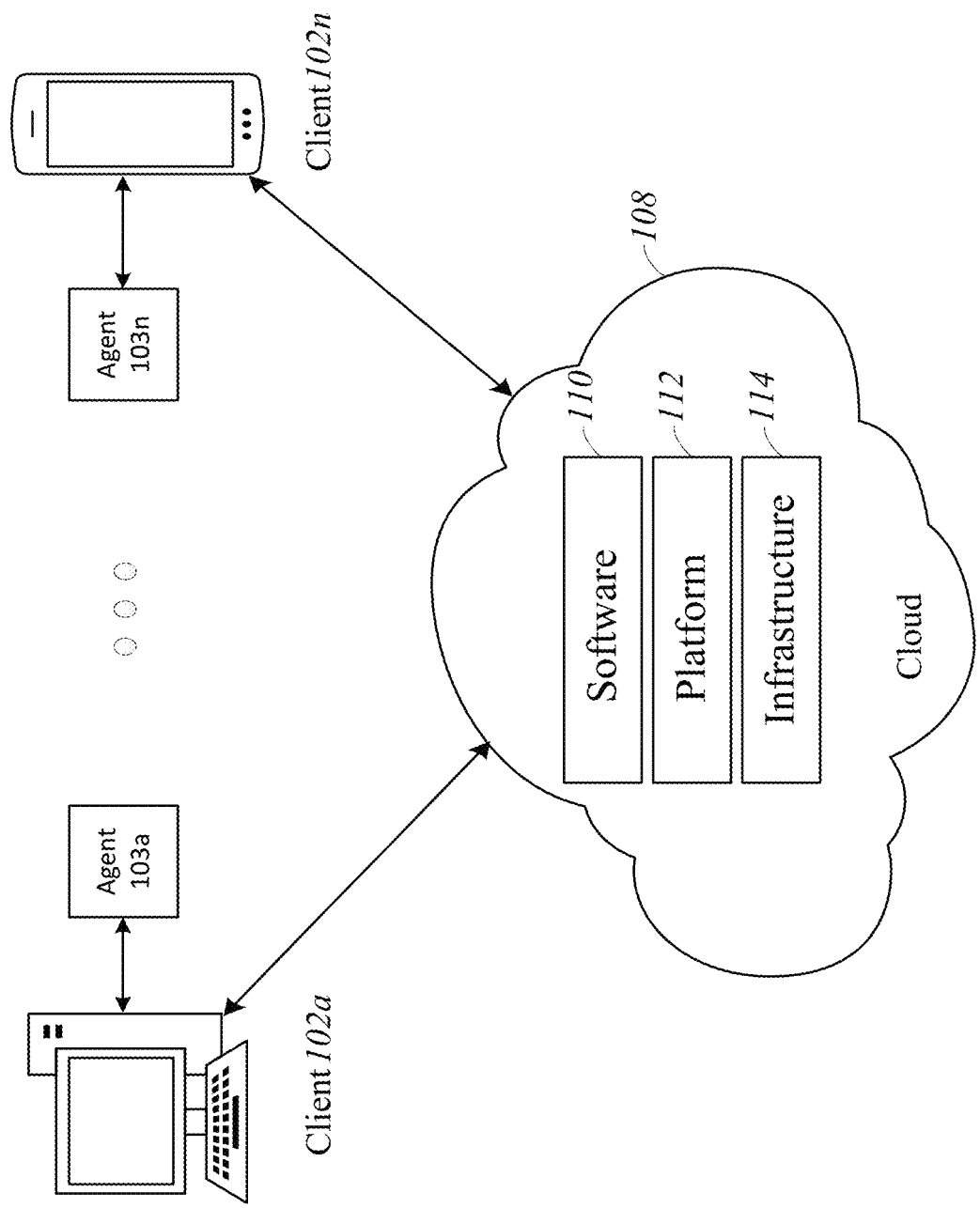
FIG. 1B is a block diagram depicting a cloud computing environment comprising a client device in communication with cloud service providers.

Below are detailed descriptions of various concepts related to, and implementations of, techniques, approaches, methods, apparatuses, and systems for identifying and providing private contests using a profile graph. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for controlling and modifying permissions for private data objects.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
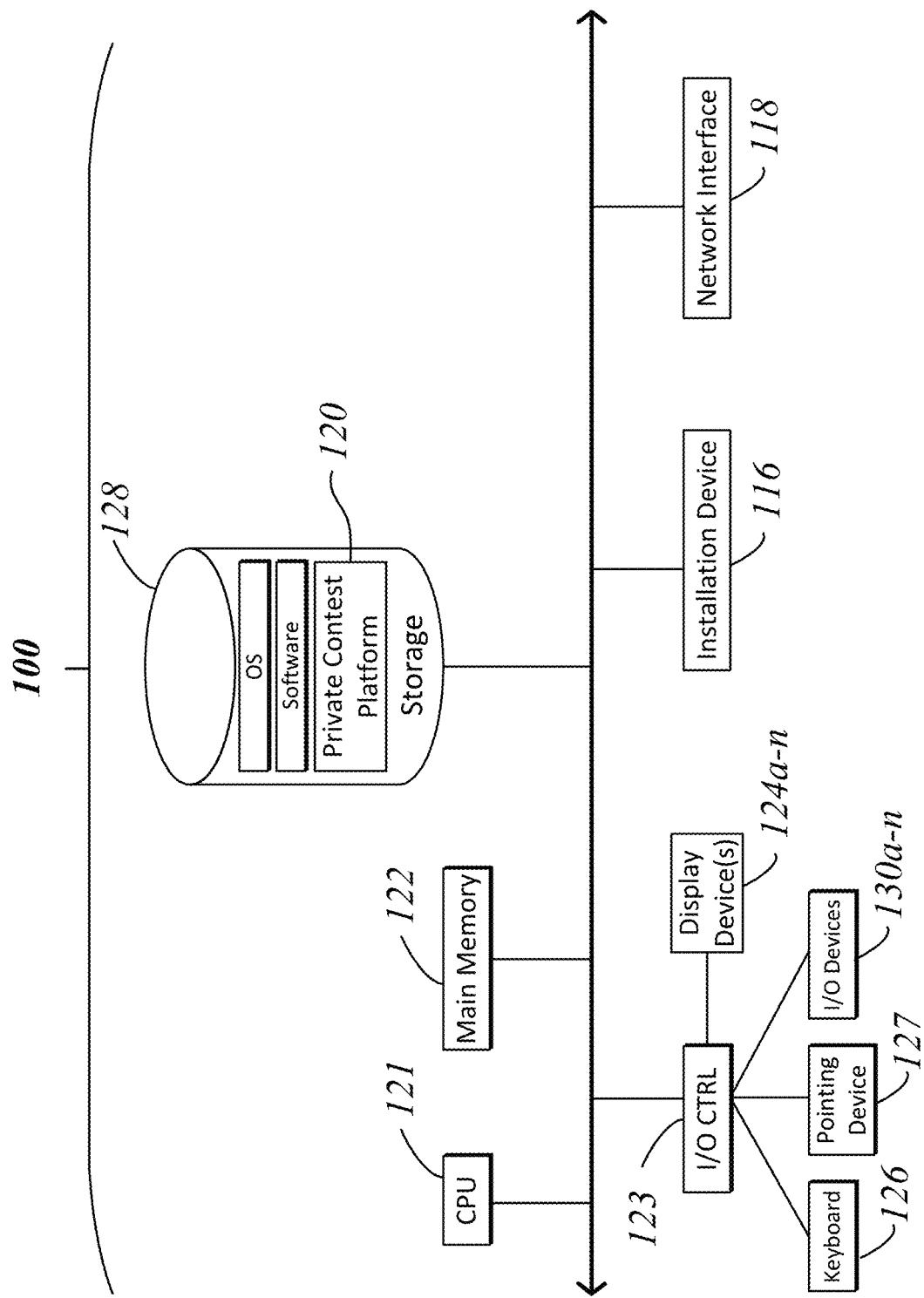
FIGS. 1C and 1D are block diagrams depicting embodiments of computing devices useful in connection with the methods and systems described herein.
Figure 1D:
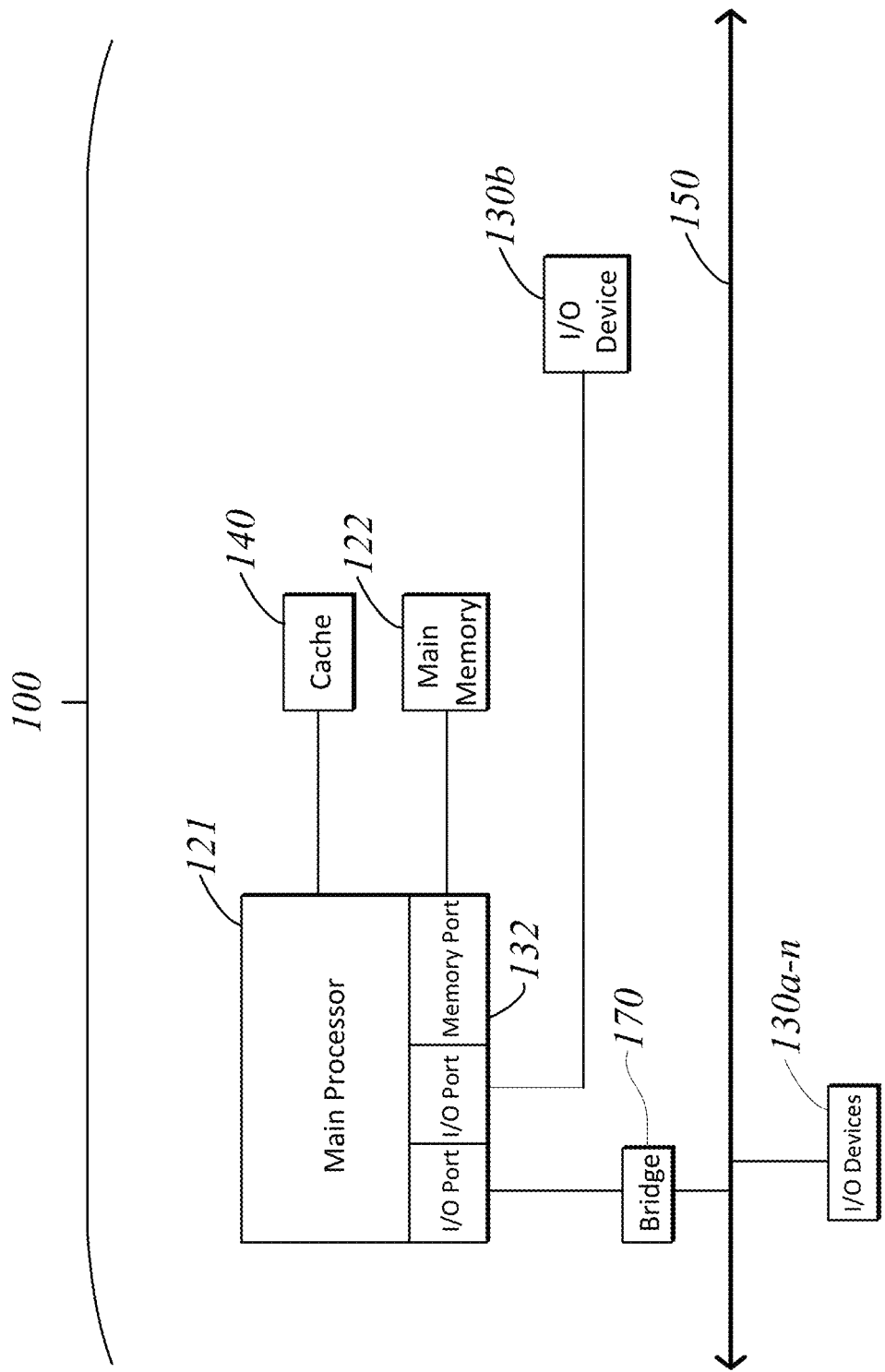

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and private contest platform 120, which can implement any of the features of the contest system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the private contest platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Controlling and Modifying Access Permissions for Private Data Objects

Data security, particularly for data that is shared among multiple computing devices, is of paramount importance. Often, data is shared between computing devices that are connected in a network, which typically forms a network topology. The network topology includes computing devices that are represented as nodes in a node graph, and links between computing devices, which can be represented as edges in said graph. However, simply allowing any data to be shared across computing devices that are connected to one another in a network presents risks to the security of data, as any computing device in the network can access any item of data that is maintained or shared by any computing device.

Such systems traditionally implement permission-based access for each item of data that can be shared on such a network. In such configurations, data items, or data objects, include permissions that restrict access to the data object by users or computing devices that are not authorized to access the data object, and allow access by users or computing devices that are authorized access by a data object maintainer or organizer. Therefore, in such systems, users that are not authorized to access such data objects cannot view or modify those data objects without sufficient permissions. Such permissions are often governed by an owner of the data object, or another type of central authority, that indicates which user profiles are authorized to access each data object.

While such configurations provide sufficient protection from unauthorized access to protected or private data objects, they also introduce a number of issues in systems where access to private data objects is required to perform certain data processing activities. Often, organizers that govern access to private data objects may only grant access to user profiles with which the organizer is associated. This generally restricts the number and reach of private data objects, which is disadvantageous for private data objects that require access by a predetermined number of users to satisfy processing requirements. In another case, an organizer may intend to grant access to computing devices that are local to the organizer (e.g., within one or more two hops in a node graph, etc.), even though such users may not necessarily be specifically known by the organizer.

The systems and methods of this technical solution address these and other issues by providing techniques for requesting access to private data objects based on mutual associations in a node graph, which can be a network topology node graph or another type of graph data structure for user profiles. Such functionality can allow users to request access to private data objects that other user profiles, such as those identified as neighboring nodes of the user in a node graph, are authorized to access. By allowing users to request authorization to access private data objects that their neighboring nodes are authorized to access, additional data access opportunities are provided to users without sacrificing the security and privacy of private data object organizers. In addition, by exposing private data object access opportunities to more users in a secure manner, the likelihood that processing requirements for a private data object will be satisfied, particularly for data objects that require association with a predetermined number of authorized users to satisfy processing requirements.

One such implementation of these techniques can be applied to a mesh network, in which an organizer, or leader, of the mesh network can receive requests from other computing devices to join the mesh network that have an association with members of the mesh network. In this case, the private data objects can be routing adjacency information for other nodes in the mesh network, and permissions to transmit information throughout the mesh network without being blocked by a firewall or another type of security implementation. In this example, a user that is not a member of the mesh network can transmit a request to join mesh network if they are associated with (e.g., are authorized to communicate with, etc.) a computing device that is a member of the mesh network. Upon approval by the organizer of the mesh network, the organizer can grant access to the requesting computing device by adding the requesting computing device to a list of authorized users for the mesh network, and by granting the requesting user access to routing adjacency information to transmit information throughout the mesh network.

Another implementation of node-based access functionality is "knock to join" functionality for private contests. The knock to join functionality allows users to view private contests that associated user profiles, such as profiles indicated as friends of the user, are registered for. By allowing users to view the private contests in which their friends are enrolled, additional registration opportunities for private contests are provided to additional users without sacrificing the security and privacy of contest organizers by exposing private contest details to an entire social network. In addition, by exposing private contest opportunities to more users in a secure manner, the likelihood that a private contest will satisfy its minimum participant requirements by the registration deadline increases significantly.

In a non-limiting example of the foregoing techniques, a user can access a social media platform for public and private contests using an application executing on a client device. Public contests can be contests, such as fantasy sports contests, that any user of the social media platform can access and engage with (e.g., become a registrant, place wagers, create fantasy sports lineups, etc.). However, private contests typically limit registration to a preset group of individuals invited by the contest organizer. In general, an organizer can use the client application to create a private contest, and in some cases can specify a contest registration deadline and a minimum or fixed number of participants that must register for the private contest in order for the private contest to initiate.

After the organizer creates a private contest and invites one or more users to register for the private contest, there is no guarantee that all invitees will register for the contest. And without the predetermined number of registrants, the private contest will not initiate. To add more users, simply opening the private contest to be viewed publicly by every other user on the social network may jeopardize the privacy of the organizer and defeat the purpose of a private contest by making it a public contest. In other words, users that the organizer does not wish to see the private contest can access the private contest if it is provided publicly. The systems and methods of this technical solution solve this issue by merging a profile graph of user profiles with the private contests created by its users, to provide users who are affiliated with the invitees (e.g., mutually indicated as friends, ect.) of the organizer to view the private contests in which the invitees are registered. Said another way, the systems and methods described herein provide techniques for a user to view and request access to the private contests that their friends are participating in.

When creating a private contest, an organizer can specify the private contest as viewable by the friends of each invitee to the private contest. In addition, the organizer of the private contest can specify that the friends of each invitee to the private contest can "knock to join" the private contest, or transmit a request to the organizer to join the contest by interacting with a corresponding user interface element, even if those individuals were not invitees of the organizer directly. This allows the friends of the invitees of the organizer to view and engage with contests that would otherwise be hidden. Likewise, the organizer has control over which users can view and join the contest by specifying certain invitees. When a user interacts with the knock to join user interface element of a private contest, a request is transmitted a client device of the organizer of the private contest with an indication of the user requesting to join, and the affiliation of the user to a current participant of the contest. If the organizer approves the user to join, the user is authorized to register for the contest as if the user was an original invitee. If the organizer denies the user access, the user will be unable to register for the contest.

Thus, the systems and methods of this technical solution allows user to view private contests that are engaged by other user profiles with which the users have a shared association. In doing so, additional viewing and engagement opportunities are provided to users without sacrificing the privacy and security of contest organizers. Further, the systems and methods described herein can provide additional authorized users access to certain private contests, increasing the likelihood that such private contests will satisfy their minimum participant requirements by their respective registration deadlines, which is an improvement over other implementations. These and other features of gaming devices are described in greater detail herein below.

Figure 2:
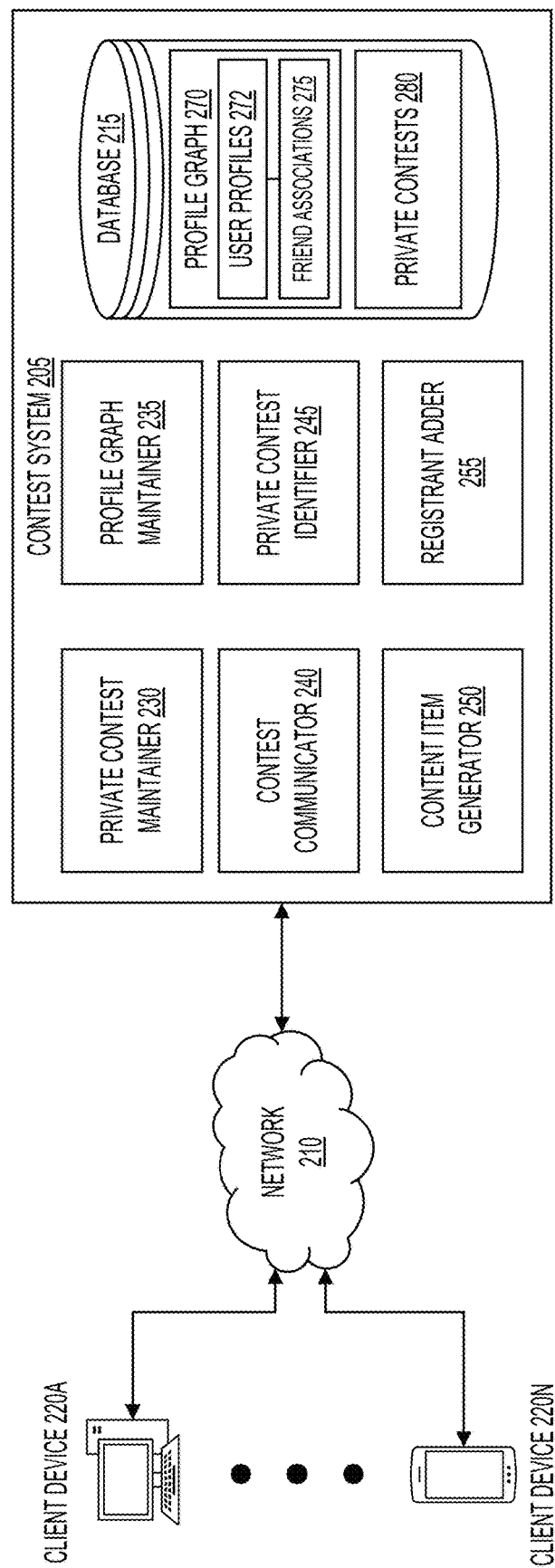
FIG. 2 is a block diagram of an example system that identifies and provides private contests using a profile graph, in accordance with one or more implementations.

Referring now to FIG. 2, illustrated is a block diagram of an example system 200 for identifying and providing private contests using a profile graph, in accordance with one or more implementations. The system 200 can include at least one contest system 205, at least one network 210, and one or more client devices 220A-220N (sometimes generally referred to as client device(s) 220). The contest system 205 can include at least one private contest communicator 230, at least one profile graph maintainer 235, at least one content communicator 240, at least one private contest identifier 245, at least one content item generator 250, at least one registrant adder 255, and at least one database 215. The database 215 can include at least one profile graph 270, and one or more private contests 280. The profile graph 270 can include one or more user profile(s) 272, which can identify one or more friend association(s) 275. In some implementations, the database 215 can be external to the data processing system 215, for example, as a part of a cloud computing system or an external computing device in communication with the devices (e.g., the contest system 205, the client devices 220, etc.) of the system 200 via the network 210.

Each of the components (e.g., the contest system 205, the network 210, the client devices 220, the private contest communicator 230, the profile graph maintainer 235, the content communicator 240, the private contest identifier 245, the content item generator 250, the registrant adder 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the gaming system 205 can perform the functionalities detailed herein.

The contest system 205 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a graphics-processing unit (GPU), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The contest system 205 can include one or more computing devices or servers that can perform various functions as described herein. The contest system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The contest system 205 of the system 200 can communicate via the network 210, for instance with one or more client devices 220. The network 210 may be any form of computer network that can relay information between the contest system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the contest system 205, the one or more client devices 220, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the contest system 205, the one or more client devices 220, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory (e.g., a processing circuit). The memory can store processor-executable instructions that, when executed by processor, cause the processor to perform one or more of the operations described herein. The processor can include a microprocessor, an ASIC, a GPU, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a smart-phone, a mobile device, a personal computer, a laptop computer, a television device, or another type of computing device. Each client device 220 can be implemented using hardware or a combination of software and hardware. Each client device 220 can include a display or display portion. The display can include a screen, such as a touch screen, a display of a television, a display portion of a computing device, a graphical user interface (GUI), or another type of interactive display (e.g., a touchscreen, a display, etc.) and one or more input/output (I/O) devices (e.g., a mouse, a keyboard, digital key pad). The display can include, for example, a computer display such as a monitor or a touch screen display.

In some implementations, the display can include a touch-screen display, which can receive interactions from a user. The interactions can result in interaction data, which can be stored and transmitted by the processing circuitry of the client device 220 to the contest system 205, as described herein. The interaction data can include, for example, interaction coordinates, an interaction type (e.g., click, swipe, scroll, tap, etc.), and an indication of an actionable object with which the interaction occurred. Each client device 220 can include an input device that couples or communicates with the display of each client device to enable a user to interact with and/or select one or more actionable objects as described herein. The display can enable interaction with one or more visual indications provided through the display of each mobile device 220, and responsive to an interaction (e.g., select, click-on, touch, hover), the client device 220 can generate an indication identifying a user input and/or selection of a private contest, a public contest, a friend relationship, organizing a public or private contest, or an indication to transmit a knock to join request for a private contest, among others.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can include a client application, which can be a social media application that communicates with the contest system 205 to organize or register with public or private contests as described herein. The client application can include a user application executing on the client device 220, and in some implementations can be provided to the client device 220 by the contest system 205. For example, the application can be a web-based application provided by the contest system 205 and displayed in a web browser on the client device 220. The application can include a web application, a server application, a resource, a desktop, or a file. In some implementations, the application can include a local application (e.g., local to a client device 220), hosted application, Software as a Service (SaaS) application, virtual application, mobile application, and other forms of content.

In some implementations, the application can include or correspond to applications provided by remote servers or third party servers. In some implementations, the application can access the profile graph 270, one or more user profiles 272, the friend associations 275, public contests, or the private contests 280, stored and maintained at the database 215. The application can present graphical user interfaces, for example, in response to executing instructions received from the contest system 205, to display one or more actionable objects, such as the actionable objects described herein below in conjunction with FIGS. 3 and 4. Such actionable objects can include user-selectable hyperlinks, buttons, graphics, videos, images, or other application features that generate a signal that is processed by the application executing on the respective client device 220 in response to an interaction with the actionable object. An indication with an interaction with any of the actionable objects described herein can be transmitted to the contest system 205, for example, as part of a message that includes the identification of the actionable object and one or more additional data items.

In some implementations, a client device 220 can establish one or more communication sessions between the contest system 205 and the client device 220. The one or more communication sessions can each include a channel or connection between the contest system 205 and the client device 220. The one or more communication sessions can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access information resources, such as web pages via a web browser, or application resources via a native application executing on a client device 220. When accessing information resources, the client device can execute instructions (e.g., embedded in the native applications, in the information resources, etc.) that cause the client devices to contest-related or social media-related application interfaces (sometimes referred to herein as user interfaces or GUIs), such as the user interfaces described herein below in connection with FIGS. 3 and 4. The application interfaces can be, for example, application interfaces that present different types of contests, friend associations, upcoming events, or other types of contest-related or social media-related information. In general, the application interfaces can present any kind of content (e.g., images, video, animations, graphics, audio, etc.) that is presented to a user via the input/output interfaces of a client device 220.

As described herein, the client device 220 can execute an application, such as a social media application, that presents one or more GUIs on the display of the client device 220. The application executing on the client device can be, for example, a web browser that accesses the content system 205, or a native application that communicates with the contest system 205 via the network 210. The application can be a social media application that accesses the contest system 205 using authentication credentials. For example, the application can present one or more GUIs on the display of the client device that include user interface elements that accept login credentials (e.g., a username, an email, a password, a passkey, etc.). In some implementations, biometric verification, such as a facial recognition algorithm, can be used as a login credential. Upon accepting the login credentials, the application can transmit the login credentials, which can identify a user profile (e.g., a user profile 272 described in detail herein), in a request to access the functionality of the contest system 205. The contest system 205 can verify the login credentials by comparing the login credentials to those stored in association with the identified user profile 272, and if the login credentials match, allow the application to access the functionality of the contest system 205.

Once the application has transmitted login information to the contest system 205, and the contest system 205 has verified the login information, the application can display information about the user profile 272 used to access the contest system 205. The application can communicate with the contest system 205 to organize one or more public or private contests, such as the private contests 280. For example, the application can present one or more user interfaces that allow a user to create one or more private contests 280 by communicating with the contest system. When creating a private contest 280, the application can present one or more user interface elements (e.g., actionable objects, etc.) that allow a user to specify a minimum number of registrants, a registration deadline, payout information, or any other contest-related information. The contest can be, for example, a fantasy sports contest that can include multiple participants. When creating a private contest, a user can specify one or more other user profiles 272 as invitees to the private contests. For example, when creating the private contest 280, the creator user profile 272 being used to create the private contest 280 can access one or more of the user profiles 272 sharing a friend association 275 with the creator user profile 272. The user can provide inputs to the application to select one or more invitees to the private contest 280, and confirm creation of the private contest 280 via an interaction with a corresponding actionable object.

Upon receiving confirmation of the creation of the private contest, the contest system 205 can store the private contest in one or more data structures in the database 280 in association with the creator user profile 272. For each of the user profiles 272 indicated as an invitee of the private contest 280, the contest system 205 can transmit one or more notifications to each client device 205 associated with each respective invitee user profile 272. The notifications can include one or more actionable objects that confirm whether the invitee requests to register (e.g., enroll, participate, etc.). Each client device 220 that indicates a request for registration can transmit a message to the contest system 205, and the contest system 205 can store an association between the corresponding private contest 280 and the respective invitee user profile 272 to which the notification was sent. In this way, each registrant for a private contest 280 can be identified in one or more data structures associated with the private contest 280 in the database 215. Similar processes can occur for public contests (e.g., contests indicated via one or more user interface elements as public during contest creation), with the difference being that public contests are visible to all user profiles 272 in the profile graph 270. In some implementations, when creating a private contest 280, the application can display one or more actionable objects that allow a user to integrate "knock to join" functionality with the private contest 280, as described herein. In some implementations, the knock to join functionality is integrated with the private contest 280 as a default setting.

In addition, the application executing on the client device can perform social media functionalities, including accessing the friend graph 270, searching for user profiles indicated as a friend association 275 in the accessing user profile 272, among other functionalities. For example, the application can be used to search for one or more public contests, which can be maintained, provided, initiated, and concluded by the contest system 205. Likewise, the application can be used to perform searches for one or more private contests 280. For example, a user profile 272 accessing the contest 272 via the application can transmit a request to the contest system 205 for contest information. The request for contest information can identify the requesting user profile 272. In response to the request, the contest system 205 can transmit a list of user profiles 272 indicated as having a friend association 275 with the requesting user profile 272, which are also engaged with one or more private contests 280. The list can cause the application to display one or more content items for each private contest 280 that identify the private contest 280, the one or more friend user profiles 272, the number of registrants to each private contest 280, and the registration deadline for the private contest 280, among others. Each private contest 280 indicated as having knock to join functionality can include a "knock to join" actionable object.

When a user interacts with the knock to join actionable object, the client device 220 can transmit a knock to join request to the contest system 205 that includes an identification of the user profile 272 performing the knock to join request and an identification of the private contest 280 that the user is requesting to join. Upon receiving the knock to join request, the contest system 205 can generate a message that identifies the requesting user and the friend association 275 that allowed the user to view the private contest (e.g., as described in further detail herein), and transmit the message to the client device 220 associated with the organizer user profile 272 of the private contest 280. Upon receiving the message, the client device 220 associated with the organizer user profile 272 of the private contest 280 can display, in an application, a notification that includes an indication of the user profile 272 that is requesting to join the private contest 280. In some implementations, the notification can include an indication of the friend association 275 that allowed the user profile 272 requesting to join the private contest 280 to view the private contest 280. The notification can include one or more actionable objects that allow the organizer of the private contest to allow the requesting profile 272 to register for the private contest 280, restrict the requesting profile 272 from registering for the private contest 280, authorize the requesting user profile 272 to register for one or more additional private contests 280 created by the organizer, or to block the requesting user profile 272, among others.

Upon making a selection of one or more of the actionable objects in the notification, the client device 220 of the organizer can send a response message to the contest system 205 indicating the selection (e.g., allow, deny, authorize for all contests, block user, etc.). The contest system 205 can receive and process the message in accordance with the selection made by the organizer of the private contest 280. For example, if the selection indicates the organizer allows the requesting user profile 272 to register for the private contest 280, the contest system 205 can register the requesting user profile 272 for the private contest 280 as described herein. Likewise, if the selection indicates a denial of registration, or a block message, the contest system 205 can send a denial message to the client device 220 indicating denial of the join request, or can block communications between the requesting user profile 272 and the organizer user profile 272, as described herein. Further, if the message indicates that the organizer user profile 272 authorizes the requesting user profile 272 to access and join all of the private contests 280 associated with the organizer user profile 272, the contest system 205 can update (e.g., update permissions, etc.) the private contests 280 associated with the organizer to be viewable and joinable by the requesting user profile 272.

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any data object, structure, or region maintained in the database 215. The database 215 can be accessed by the components of the contest system 205, or any other computing device described herein, via the network 210. In some implementations, the database 215 can be internal to the contest system 205. In some implementations, the database 215 can exist external to the contest system 205, and may be accessed via the network 210. The database 215 can be distributed across many different computer systems or storage elements, and may be accessed via the network 210 or a suitable computer bus interface. The contest system 205 can store, in one or more regions of the memory of the contest system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the contest system 205, to perform any of the functionalities or functions described herein. In some implementations, the database 215 can be similar to or include the storage 128 described herein above in connection with FIG. 1C. In some implementations, instead of being internal to the contest system 205, the database 215 can form a part of a cloud computing system, such as the cloud 108 described herein above in connection with FIG. 1B. In such implementations, the database 215 can be a distributed storage medium in a cloud computing system, and can be accessed by any of the components of the gaming system 205, by the one or more client devices 220, or any other computing devices described herein.

The database 215 can store a profile graph 270, for example, in one or more data structures. The profile graph 270 can include one or more user profiles 272, which can each identify one or more friend associations 275. The profile graph 270 can store each of the user profiles 272 as a node in the graph, and store one or more edges that indicate one or more relationships between a user profile 272 and other user profiles 272 of the friend associations 275. In some implementations, one or more of the edges indicating an association between two user profiles 272 can be a friend association 275. However, other edges in the profile graph 270 are possible, such as previous friend relationships, mutual friend relationships, a relationship that indicates two or more user profiles 272 previously registered for a common public contest or a common private contest 280, or any other type of social media-related relationship. The contest system 205 can query the profile graph 270 based on the edges associated with one or more user profiles 272, as described herein, to identify one or more user profiles 272 related to a query. For example, the contest system 205 can execute a query to identify all of the user profiles 272 indicated as a friend association 275 with a target user profile 272 that are registered for an upcoming private contest 280. In response to such a query, the database 215 can return a list of user profiles 272 indicated as a friend to the target user profile 272 that are currently registered for an upcoming contest 275.

The database 215 can store one or more user profiles 272, for example, in one or more data structures as part of the profile graph 270. Each user profile 272 can be associated with a user of a client device 220. A user profile 272 can include information about a user and information about one or more of the client devices 220 used to access the contest system 205 using the user profile 272. For example, identifiers of a user profile 272 can be used to access the functionality of the contest system 205, as described herein. Such identifiers can include a username, a password, an e-mail address, a phone number, a personal identification number (PIN), a secret code-word, device identifiers for use in a two-factor authentication technique, among others. The user profile 272 can store information about wagers, private contests 280 (including any upcoming contests 280 that the user profile 272 is registered for), and public contests or private contests 280 created using the contest system 205. The user profile 272 can store identifiers of each private contest 280 that the user profile 272 is registered for, including historic records of previous private contest 280 registrations, wager information (e.g., an amount of a wager, a contest entry fee, etc.). The user profile 272 can store information about a client device 220 used to access the contest system 205 such as an IP address, a MAC address, a GUID, an account name (e.g., the name of a user of the client device 220, etc.), device name, among others. In some implementations, a user profile 272 can be created by the contest system 205 in response to an account creation request transmitted by a client device 220. The account creation request can include any of the account information described herein.

The database 215 can store one or more friend associations 275 between one or more of the user profiles 272, for example, in one or more data structures in the profile graph 270. The friend associations 275 can indicate a mutual relationship between two user profiles 272. For example, to create a friend association 275, a client device 220 accessing the contest system 205 using a first user profile 272 can transmit a request to create a friend association 275 with a second user profile 272. Users accessing the user profile 272 can search for other user profiles 272, for example, by name or another type of identifier, in the profile graph 270. In some implementations, the contest system 205 can transmit a list of one or more user profiles 272 that the contest system 205 determines are similar (e.g., including similar attributes, contest participation, etc.) a user profile 272 accessing the contest system 205. Upon receiving a request to create a friend association 275 with a second user profile 272, the contest system can transmit a notification indicating the request to a client device 220 associated with the second user profile 270 indicating the first user profile 272 requests to create a friend association 275. The client device 220 accessing the contest system 205 using the second user profile 270 can receive approval from a user (e.g., via an interaction, etc.) to accept the friend request, and transmit a message to the contest system 205 approving the friend request. In response to receiving the approval of the friend request, the contest system 205 can create a friend association 275 between the first user profile 272 and the second user profile 272.

Each friend association 275 can indicate a relationship between a first user profile 272 and a second user profile 272. A friend association 272 can indicate one or more permissions that allow a user of the first user profile 272 to view or access one or more properties of the second user profile 272, and vice versa. For example, a user of the first user profile 272 can view a profile page for the second user profile 272, which can include one or more indications of private contests 280 or public contests to which the second user profile 272 is registered. In addition, a friend association 275 can enable a first user profile 272 to transmit one or more messages to a second user profile 275, or view one or more posts of a second user profile in a feed of content customized for the first user profile 272. In some implementations, a client device accessing the contest system 205 using a first user profile 272 can transmit a request to remove a friend association with a second user profile 272. In response to the request, the contest system 205 can delete, or otherwise remove the friend association 275 with the second user profile 272, revoking the permissions or functionalities with respect to the second user profile 272 described herein.

The database 215 can store or maintain one or more private contests 280, for example, in one or more data structures. The private contests 280 can be or can include private data structures, which are sometimes referred to herein as private data objects. The private contests 280 can be contests that include permissions such that only user profiles 272 indicated as invitees to the private contest 280 can register for the private contest 280. A private contest 280 can be any sort of contest or wagering opportunity, sporting event, a fantasy sporting event, or any type of event that a user can place a wager on or bet on. For example, a private contest 280 can include a contest that one or more users, associated with user profiles 272, can register for to participate in (e.g., registrants). A private contest 280 can include or refer to, but is not limited to, a football game, basketball game, a soccer match, golf tournament, baseball game, an e-sports event (e.g. a video game or computer game contest), or any type of sporting contest. The private contests 280 can include sporting events that are scheduled within a determined time period (e.g., planned but not started yet) and/or active sporting events that are underway (e.g., have started or begun) but have not completed yet. An example representation of a private contest 280, is shown in the following table, where the left-hand column indicates labels for each row (e.g., which are for demonstration only and not necessarily included in the private contest 280), and the right-hand column includes non-limiting examples for data entries relating to each property of the private contest 280.

TABLE 1

Example Private Data Object for a Private Contest 280

| Contest Name | "Contest A" |
| Organizer | <user identifier of organizer> |
| Public Contest? | False |
| Knock to Join Contest? | True |
| Minimum Number of Registrants | 20 |
| Current Number of Registrants | 7 |
| Reference to List of Registrants | <reference to list of user identifiers that have registered for the private contest 280> |
| Reference to List of Authorized Users | <reference to list of user identifiers that are authorized to access the private contest 280> |

When a private contest 280 is generated by the contest system 205, as described herein, the contest system 205 can initialize each of the fields above with values specified by the organizer in the request to create the private contest 280. As shown in Table 1 above, each private contest 280 can include a list of registrants and a list of user profiles 272 that are authorized to view or register for the private contest 280. For example, the list of user profiles 272 that are authorized to view or register for the private contest 280 can be a list of user profiles 272 that are indicated as invitees to the private contest 280. If the private contest 280 is a knock-to-join private contest, the list of authorized user profiles 272 can be expanded via friend associations 275, as described in greater detail herein.

In some implementations, each private contest 280 can be associated with a registration deadline. The contest system 205 can initiate (e.g., allow contest to proceed according to its wagering terms, etc.) at the registration deadline if a minimum number of registrants has been satisfied. Each private contest 280 can include one or more parameters. The private contest 280 parameters can include, but are not limited to, a type of wagering opportunity available to registrants, minimum a wager amount for each registrant, a team name, a contest name, and an outcome. The private contest 280 parameters can include, but are not limited to, a type of sport, a type of contest, odds associated with the private contest 280, or odds 436 associated with each wager placed on the private contest 280. The parameters of the private contest 280 can include an indication that the private contest 280 is a knock to join contest that implements the knock to join functionality described herein. The private contests 280 can be generated and maintained by the contest system 205 as described herein.

Referring now to the operations of the contest system 205, the private contest maintainer 230 can maintain one or more private contests 280, for example, in one or more data structures in the database 215. As described herein, each private contest 280 can identify a registration deadline, a predetermined number of registrants, and an organizer user profile 272. As described herein, users can access the contest system 205 via an application executing on a client device 220 to create one or more private contests 280. Maintaining the one or more private contests 280 can include creating private contests 280 in response to requests received from client devices 220. For example, the private contest maintainer 230 can receive a request to create a private contest 280, which can indicate one or more invitee user profiles 272. In response to the request, the private contest maintainer 230 can create a corresponding private contest 280 in the database 215 in accordance with private contest 280 parameters specified in the request. If the request specifies one or more invitee user profiles 272, the private contest maintainer 230 can transmit a notification to a client device associated with each invitee user profile 272. The notification can include an indication to register for the private contest 280, and can include one or more actionable objects that allow a user to indicate registration in the private contest 280. In response to an interaction with the actionable object, the corresponding client device 220 can transmit a request to join the private contest 280. Upon receipt of the request to join, the private contest maintainer 230 can store an association between the respective user profile 272 that requested to join the private contest 280 and the private contest 280. For example, the private contest maintainer 230 can add an identifier of the respective user profile 272 to the list of registrants of the private contest 280.

In some implementations, the private contest maintainer 230 can manage the initiation of the private contests 280. For example, the private contest maintainer 230 can monitor the number of registrants for each private contest 280 and the registration deadlines for each private contest 280. In some implementations, the private contest maintainer 230 can initiate a private contest 280 in response to determining that the number of registrants for the private contest 280 is equal to the minimum number of registrants of the private contest 280 at the registration deadline. Initiating the private contest 280 can include, for example, preventing registrants from changing any wagers or fantasy sports lineups related to the private contest 280, and resolving wagers relating to the private contest 280 according to the rules of the private contest 280. In addition, the private contest maintainer 230 can allocate computing resources, such as processing time and computer memory to process the private contest. In some implementations, the private contest maintainer 230 can allocate the computing resources for the private contest 280 by controlling a server farm to initiate and execute the private contest 280 as described herein. Likewise, the private contest maintainer 230 can also determine if the minimum number of registrants for the private contest 280 is not satisfied at the registration deadline of the private contest 280. Upon making this determination, the private contest maintainer 230 can restrict the private contest 280 from initiation, for example, by canceling the private contest 280. If the private contest maintainer 230 cancels a private contest 280, the private contest maintainer 230 can transmit a notification to each client device 220 associated with each invitee of the private contest 280.

The profile graph maintainer 235 can maintain a profile graph 270, for example, in one or more data structures in the database 215. The profile graph 270 can include one or more user profiles 272, which can each maintain one or more friend associations 275 with one or more friend user profiles 272. Each user profile 272 identified by a friend association 275 can be identified as a friend of a corresponding second user profile 272 identified by the friend association 275. As described herein, users of the client devices 220 can access the contest system 205 using a respective user profile 272 that identifies the user. Using an application executing on the client device 220, a user can create a user profile 272 by communicating with the profile graph maintainer 235. For example, a user of a client device 220 can interact with one or more user interfaces to provide user information, such as authentication credentials and other identifying user information, into the application on the client device. The client device 220 can transmit a request to create a user profile 272 in the profile graph 270 using the specified user information. The private contest maintainer 230 can receive the request and create the user profile 272 by storing the specified user information in the profile graph 270.

The profile graph maintainer 235 can further maintain one or friend associations between the user profiles 272 in the profile graph 270. The friend associations 275 can indicate a mutual relationship between two user profiles 272. To create a friend association 275, a client device 220 accessing the contest system 205 using a first user profile 272 can transmit a request to create a friend association 275 with a second user profile 272. Users accessing the user profile 272 can search for other user profiles 272, for example, by name or another type of identifier, in the profile graph 270. In response to a search request for other user profiles 272 profile graph maintainer 235 can transmit a list of one or more user profiles 272 that the profile graph maintainer 235 determines is similar (e.g., including similar attributes, contest participation, etc.) to the user profile 272 accessing the contest system 205. In addition, the profile graph maintainer 235 can suggest other user profiles 272 that are indicated as friends of user profiles 272 indicated as friends of the first user profile 272. The client device 220 can select any of these user profiles 272 (e.g., via an interaction, etc.), and transmit a request to create a friend association 275 with the selected second user profile 272. Upon receiving a request to create a friend association 275 with a second user profile 272, the profile graph maintainer 235 can transmit a notification to a client device 220 associated with the second user profile 270 indicating the first user profile 272 requests to create a friend association 275. The client device 220 of the second user profile 270 can receive approval from a user (e.g., via an interaction, etc.) to accept the friend request, and transmit a message to the profile graph maintainer 235 approving the friend request. In response to receiving the approval of the friend request, the profile graph maintainer 235 can create a friend association 275 between the first user profile 272 and the second user profile 272.

The contest communicator 240 can receive a request for private contest 280 information from a client device 220 associated with a user profile 272. As described herein, the user profile can maintain one or more friend associations friend user profiles 272 indicated in the friend associations 275 of the user profile 272. The request for private contest 280 information can be a request for one or more private contests having registrants identified as friends in the friend associations of the user profile 272. In other words, the request can be a request for a list of private contests 280 that the user's friends are participating in. In some implementations, the request can include filtering criteria, such as a private contest 280 type, a private contest 280 size (e.g., registration count, payout amount, etc.), or other private contest 280 attributes described herein. The request can be transmitted, for example, in response to an interaction with a corresponding user interface element presented in an application executing on the client device 220 associated with the user profile 272.

Upon receiving the request, the private contest identifier 245 can identify, using the profile graph 270 and from the private contests 280, a subset of private contests 280 available for registration by the user profile 272 that transmitted the request using the client device 220. For example, the private contest identifier 245 can identify each private contest 280 that has at least one friend user profile 272 of the requesting user profile 272 (e.g., indicated in the friend associations 275). In some implementations, to do so, the private contest identifier 245 can iterate through the friend associations of the requesting user profile 272 to identify a set of friend user profiles 272 of the requesting user profile 272. The private contest identifier 245 can scan through each of the friend user profiles 272 to identify each of the private contests 280 with which each friend user profile 272 is registered. The private contest identifier 245 can de-duplicate, or cluster, each private contest 280 that are identified from the friend user profile 272. In some implementations, the private contest identifier 245 can identify private contests 280 by first scanning through the registrants of all the private contests 280 in the database 280 and comparing the registrants to the list of friend user profiles 272 indicated in the friend associations 275 of the requesting user profile 270. As described herein, the private contest identifier 245 can identify private contests 280 that are upcoming (e.g., the registration deadline has not passed, the private contest 280 has not been canceled, etc.).

In some implementations, the private contest identifier 245 can identify the private contests 280 available for registration by the first user profile further by filtering the private contests 280 by registration deadline. For example, the private contest identifier 245 can implement filtering policy to exclude private contests 280 that are expiring very soon (e.g., within a minute, within thirty seconds, within fifteen seconds, within five seconds, etc.). In this way, the private contest identifier 245 can prevent the display or retrieval of private contests 280 that cannot practically be joined by the user making the request for private contest information 280. Other filtering criteria are also possible, in some implementations, in combination with registration deadline based filtering or any other filtering techniques described herein for private contests 280.

In some implementations, the private contest identifier 245 can identify the private contests 280 available for registration by the requesting user profile 272 by filtering the private contests 280 according to the number of registrants of each private contest 280 compared to the minimum number of registrants required for the private contest 280 initiate, following identifying the private contests 280 has having friends as registrants. For example, the private contest identifier 245 can filter the private contests 280 to those that require only a few (e.g., one, two, three, etc.) additional participants to meet the required minimum number of participants for the private contest. In doing so, the private contest identifier 245 can cause private contests 280 which are close to meeting their minimum registration deadlines to requesting users, making these private contests 280 more likely to satisfy their registration requirements. In some implementations, the private contest identifier 245 can filter the private contests 280 those that only have a few participants (e.g., one, two, three, etc.), following identifying the private contests 280 has having friends as registrants.

In some implementations, the private contest identifier 245 can identify the private contests 280 from the friend user profiles 272 based on a correspondence between attributes of the private contest 280 and attributes of the requesting user profile 272. For example, the requesting user profile 272 can indicate contest preference information, such as a historic record of types of private or public contests that the user profile 272 has registered for. In some implementations, the user profiles 272 can indicate an average wager amount for different types of contests, including previously completed private contests 280. The private contest identifier 245 can compare the attributes of each private contest (e.g., the wager amount, contest type, etc.) to the historic records of the requesting user profile 272. The private contest identifier 245 can identify the private contests 280 that have similar attributes (e.g., same type, wager requirements within a predetermined threshold similarity range, a number of registrants within a predetermined threshold similarity range, a payout within a predetermined threshold similarity range, etc.) to the private contests 280 that included the requesting user profile 272 as a registrant.

Once the subset of private contests 280 have been identified from the friend user profiles, the content item generator 250 can generate a content item for each private contest 280. If the private contest includes knock to join functionality, the content item generator 250 can generate a content item for the private contest 280 that includes a knock to join actionable object. The knock to join actionable object, when actuated via user input on a client device 220, can cause the client device 220 to request to join the private contest 280. The content item can include information about the private contest, such as the number of registrants for the private contest 280, a minimum number of registrants for the private contest 280, a maximum number of registrants for the private contest 280, the type of the private contest 280, a number of friend user profiles 272 that are registered for the private contest 280, wagering information (e.g., a payout amount, a minimum wager amount, a maximum wager amount, etc.), and indications of one or more friend user profiles 272 that are enrolled in the private contest 280. If the private contest 280 does not have knock to join functionality, the content item may not include a knock to join actionable object, and can instead display an indication that the corresponding private contest 280 is private and cannot be joined by user profiles 272 not designated as invitees. Generating a content item can include generating one or more data structures including instructions or metadata, that when interpreted or executed by the application executing on the client device 220, cause the application to display the content item, which can include the actionable objects or user interface elements described herein.

Once the content items are generated, the content item generator 250 can generate a list of private contests 280 that includes each generated content item for each identified private contest 280 from the friend user profiles 272. The list of private contests 280 can be, for example, instructions or metadata that cause a client device to render one or more of the generated content items in an application executing on the client device. The list of private contests can be stored, for example, in the database 215 in association with the user profile 272 that made the request for the private contest 280 information. In some implementations, the list of private contests 280 can indicate an order of the private contests 280. To determine the order of the list of private contests 280, the content item generator 250 can sort the list of private contests 280 according to various criteria.

In some implementations, the content item generator 250 can sort the list of private contests 280 according to the number of friend user profiles 272 indicated as registrants for the private contests 280. For example, the private contests 280 having the largest number of friend user profiles 272 as registrants can be positioned at the top of the list, while the private contests having the fewest number of friend user profiles 272 as registrants can be positioned at the bottom of the list. In some implementations, contests positioned at the top of the list of private contests 280 can be displayed to the user first (e.g., at the top of the display of the application), and so on until the bottom of the list. Other sorting criteria are also possible. For example, the content item generator 250 can sort the list of private contests 280 by wager amount, maximum number of registrants, payout amount, contest name (e.g., alphabetical order, reverse alphabetical order, etc.), contest type, or any other attribute of a private contest 280. In some implementations, sorting the list of private contests 280 can take place on the client device 280. For example, the content item generator 250 can generate the list of private contests 280 with instructions or metadata that causes a client device displaying the list of private contests 280 to display the list of private contests 280 in a particular order. In some implementations, the instructions or metadata can cause the client device 220 to display one or more actionable objects that allow a user to sort the list of private contest 280 at the client device according to one or more selected sorting criteria.

Upon generating the list of private contests 280, the contest communicator 240 can present the list of private contests 280 on a display of the client device 220 that transmitted the request for private contest 280 information. As described herein, the display of the list of private contests 280 can include one or more of the content items generated for each private contest 280 identified by the private contest identifier 245 (e.g., those that correspond to friend user profiles 272 indicated in the friend associations 275 of the requesting user profile 272). To do so, the contest communicator 240 can transmit the list of private contests 280, which includes the content items generated by the content item generator 250, to the client device 220 that transmitted the request for the private contest 280 information. As described herein, the list of private contests 280 can include instructions or metadata that when executed or interpreted by the application executing on the client device, cause the application to present the list of private contests 280 in one or more user interfaces. In some implementations, a user of the client device 220 can interact with the application, for example, by preforming one or more swipe motions, to scroll through the list of private contests 280 (e.g., the list of content items corresponding to each private contest 280, etc.). An example interface that displays a list of private contests is described in greater detail herein in connection with FIGS. 3 and 4. A user of the client device can interact with actionable objects in one or more of the content items to transmit a knock to join request for a private contest 280 to the contest communicator 240, as described herein.

If the user interacts with the knock to join actionable object in a content item displayed in the list of private contests 280, the client device 220 can transmit a knock to join request to the contest communicator that includes an identification of the corresponding private contest 280, user profile 272 performing the knock to join request. In some implementations, the knock to join request can include an indication of the friend association 275 or the friend user profile 272 that is registered for the private contest 280. Upon receiving the knock to join request, the contest communicator 240 can generate a message that identifies the requesting user profile 272 and the friend association 275 (e.g., identifying the friend user profile 272, etc.) that allowed the user to view the private contest 280. The contest communicator can transmit the message to the client device 220 associated with the organizer user profile 272 of the private contest 280 identified in the knock to join request.

Upon receiving the message, the client device 220 associated with the organizer user profile 272 of the private contest 280 can display, in an application executing on the client device of the organizer, a notification that includes an indication of the user profile 272 that is requesting to join the private contest 280. An example depiction of the notification is described herein below in connection with FIG. 3. In some implementations, the notification can include an indication of the friend association 275 that allowed the user profile 272 requesting to join the private contest 280 to view the private contest 280. The notification can include one or more actionable objects that allow the organizer of the private contest 280 to allow the requesting profile 272 to register for the private contest 280, restrict the requesting profile 272 from registering for the private contest 280, authorize the requesting user profile 272 to register for one or more additional private contests 280 created by the organizer, or to block the requesting user profile 272, among others. In some implementations, the notification can appear at the client device 220 of the organizer in a notification queue, which can include other notifications for other private contest 280 knock to join requests, or friend requests as described herein.

Once the organizer of the private contest 280 interacts with one of the actionable objects in the notification, the client device 220 of the organizer can send a response message to the contest communicator 240 that indicates the selection (e.g., allow, deny, authorize for all contests, block user, etc.). Example selections for the notification are shown in the interface 330 of FIG. 3. The contest communicator 240 can receive and process the response message in accordance with the selection made by the organizer of the private contest 280. If the selection indicates the organizer allows the requesting user profile 272 to register for the private contest 280, the registrant adder 245 can register the requesting user profile 272 for the private contest 280 as described herein. In some implementations, the contest communicator 240 can store an association between the requesting user profile 272 and the private contest 280 that indicates the requesting user profile 272 is authorized to register for the private contest 280. Upon storing the association, the contest communicator 240 can transmit an authorization notification to the client device 220 of the requesting user profile indicating that the organizer has authorized registration for the private contest 280, instead of automatically registering the requesting user profile 272 for the private contest. The authorization notification can be displayed in the application executing on the client device, for example, in a notification queue, and can include an actionable object that allows the user to request registration for the private contest 280. Upon interacting with the actionable object, the application executing on the client device can transmit a request to register for the private contest 280 to the registrant adder 255, which can register the user for the private contest 280 as described herein.

If the selection by the organizer indicates a denial of registration, or a block message, the contest communicator 240 can send a denial message to the client device 220 indicating denial of the join request, or can block communications between the requesting user profile 272 and the organizer user profile 272, by storing a block association between the user profile 272 and the organizer user profile 272 in the profile graph 270. A block association can identify a first user profile 272 in the profile graph 270 and a second user profile 272 in the profile graph 270. A block association can prevent the contest system 205 from providing information about a first user profile 272 to a second user profile 272, and vice versa, effectively hiding the existence of each user profile 272 from one another. If the message indicates that the organizer authorizes the requesting user profile 272 to access and join all of the private contests 280 associated with the organizer user profile 272, the contest communicator 240 can update (e.g., update permissions, etc.) each private contest 280 organized by the organizer user profile 272 to be viewable and joinable by the requesting user profile 272. Updating a private contest 280 can include storing an association between the requesting use profile 272 and the private contest 280. In some implementations, the contest communicator 240, upon storing the authorization, can transmit a notification to the requesting user profile 272 indicating that the requesting user profile can access the private contests 280 organized by the organizer user profile 272 that authorized access.

The registrant adder 255 can add the client device as a registrant for the private contest 280, in response to receiving a request to register for a private contest 280. The private contest 280 can be a knock to join private contest 280, which the organizer of the private contest 280 authorized the requesting user profile 272 to register. In some implementations, the request to register for the private contest 280 can specify contest entrant information, including an identification of the requesting user profile 272, and wagering information, such as a wager amount, fantasy sports information, a selection of one or more possible contest outcomes, or any other wager-related information. To register a user profile 272 for the private contest 280, the registrant adder 255 can store an association between the private contest 280 and the user profile 272, and increment the total participant count. In addition, if the contest involves a wager that specifies an amount of credits, or a payment amount, the registrant adder 255 can remove the credits or the payment amount from the user profile 272 and add the credits or the payment amount to the private contest 280 in accordance with the rules of the private contest.

Figure 3:
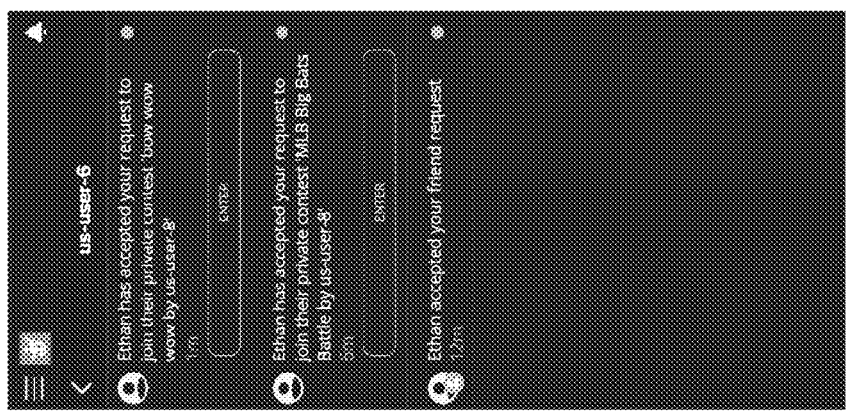
FIG. 3 illustrates example user interfaces relating to the identification of private contests using a profile graph, in accordance with one or more implementations.
Figure 3:
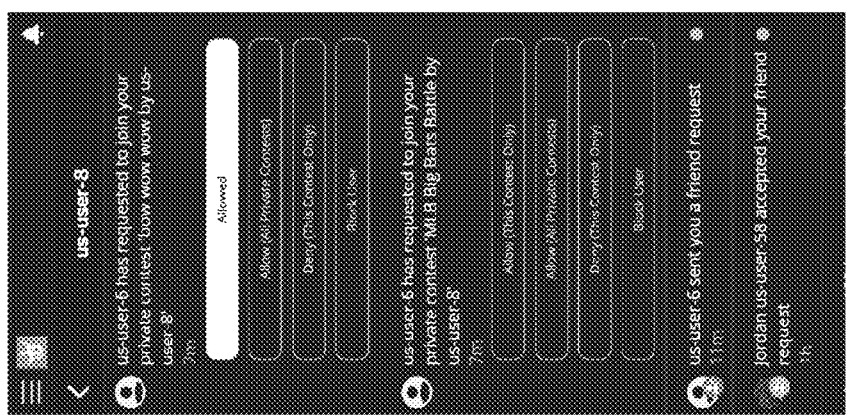
Figure 3:
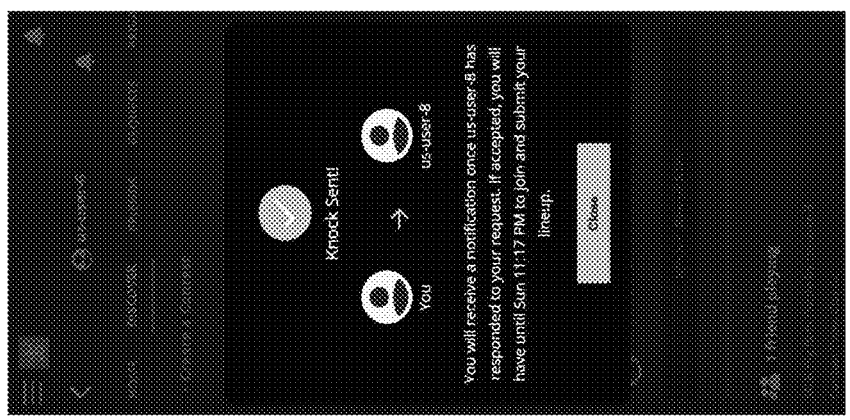
Figure 3:
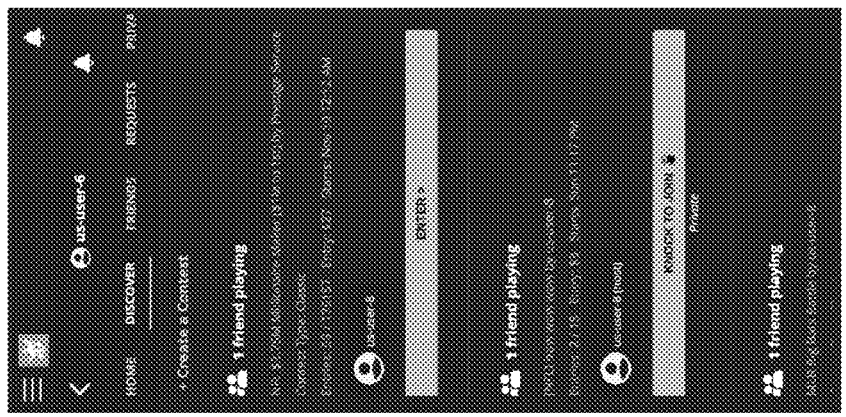

Referring briefly now to FIG. 3, illustrated are example user interfaces relating to the identification of private contests using a profile graph, in accordance with one or more implementations. The user interfaces shown in FIG. 3 correspond to various stages of the knock to join process. The user interface 310 shows a list contests, such as the list of private contests 280 described herein in connection with FIG. 2, being displayed in an application of a first client device 220. The first client device 220 is operated by a user profile 272 "us-user-6." As shown in the user interface 310, the user has navigated to the "Discover" tab, which can display a list of contests that the user can join. In some implementations, navigating to the "Discover" tab in the application can cause the client device to transmit a request for private contest 280 information to the contest system 205, which can return a list of contests in response to the request. The list of contests is shown as a list of content items corresponding to each contest in the list in the user interface 310. As shown, each content item can identify a number of participating friends of the user profile 272, a contest type, a number of entries, an entrant limit, a registration deadline, a contest name, among others. The contest at the top of the list is a public contest, and therefore includes an "Enter" actionable object, which when actuated causes the client device 220 to transmit a request to the registrant adder to register for the public contest, as no additional authorization is required. The next contest is a private contest, indicated by the "Private" indicator. The content item of the private contest includes a "Knock to Join" actionable object, which when actuated, causes the client device to transmit a knock to join request to the contest communicator 240, as described herein.

The user interface 320 is shown in response to an interaction with the "Knock to Join" actionable object of the private contest 280 shown in the user interface 310. As shown, the user interface 320 can identify that a knock to join request has been transmitted by the contest communicator 240 to the organizer of the private contest 280. The user interface 320 shows an identification of the requesting user profile ("You"), an identification of the organizer user profile "us-user-8", a confirmation that the knock to join request has been sent, and a message. In this example, the message includes an identification of the registration deadline for the private contest 280, however, it should be understood that the message can include any information, including any information about the private contest 280, the organizer, or the knock to join request. Once the knock to join request has been sent, a notification can be provided to the client device 220 of the organizer user profile 272, as shown in the user interface 330.

The user interface 330 is includes a notification queue, which can be displayed on the client device of the organizer user profile 272. As shown, the user interface 272 can include an identification of the user profile 272 being used to access the contest system 205 (here, "us-user-8"). The notification queue can be a list of notifications that are provided by the components of the contest system to the organizer user profile 272. The contest system 205 can store each notification in association with the organizer user profile 272. As shown, the notification created by the contest system 205 in response to the knock to join request (for the contest named "bow wow wow") is shown at the top of the notification queue. The notifications in the notification queue can be sorted, for example, such that the most recent notifications are included at the top of the queue, and older notifications are listed at the bottom of the queue.

As shown, the notification for the "bow wow wow" contest includes four actionable objects: one to allow the requesting user profile 272 (here, "us-user-6") to register for the private contest 280 (this actionable object is shown here as selected), another actionable object to allow the requesting user to access all of the private contests 280 organized by the organizer (here, "us-user-8"), another actionable object to deny the user to register for the identified private contest, and another actionable to block the requesting user profile 272. Upon selecting the "allow" actionable object, a message can be transmitted to the contest system 205 to allow the requesting user profile 272 to register for the private contest 280. In response to this message, the contest system 205 can transmit a notification to the client device 220 of the requesting user profile 272 (as described above, "us-user-6"). The notification can be displayed in the notification queue of the requesting user profile 272, as shown in the user interface 340. As shown in the user interface 340 of the client device 220 of the requesting user profile 272, the notification queue can display notifications that indicate the user has been approved to register for the private contests. Such notifications, as shown, include a "Join" actionable object. Upon interacting with the "Join" actionable object, the client device 220 of the requesting user profile 272 can transmit a request to register for the private contest to the registrant adder 255, as described herein in connection with FIG. 2.

Figure 4:
FIG. 4 illustrates various content items generated for private contests, in accordance with one or more implementations.
Figure 4:
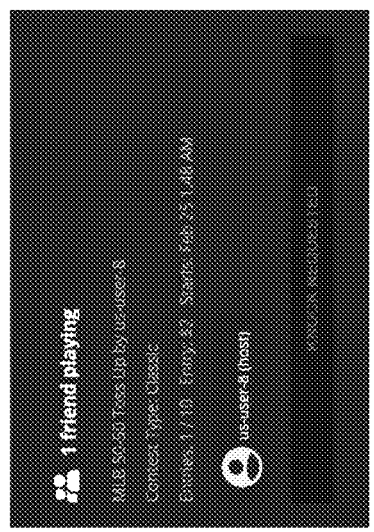
Figure 4:
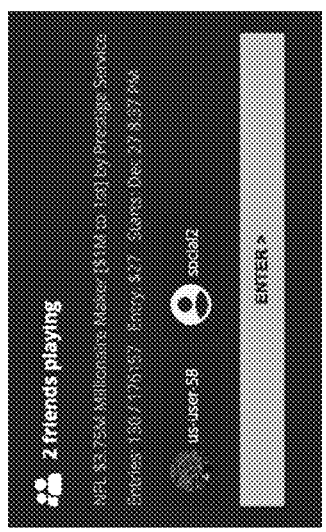
Figure 4:
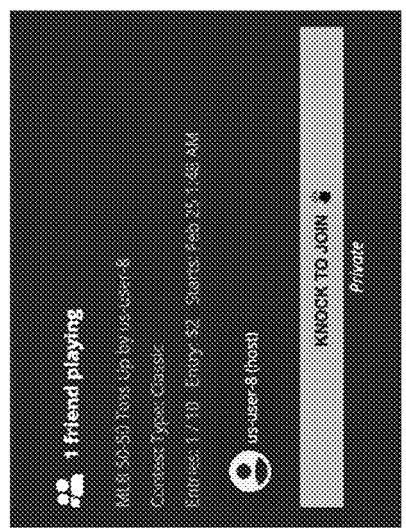

Referring now to FIG. 4, illustrated are various content items generated for private contests. As described herein, each content item can include one or more user interface elements, and information about the contest (public or private) to which the content item corresponds. The content item 410 relates to a public contest, and therefore incudes an "Enter" actionable object, that when actuated, causes a client device 220 displaying the content item 410 to transmit request to register for public contest to the registrant adder 255. The content item 410 can indicate the number of friends that are registered for the public contest, the name of the public contest, the type of the public contest, the organizer of the public contest, the number of entrants to the public contest, a wager amount for the public contest, and the registration deadline (e.g., the start time) of the public contest. In contrast to a content item of public contest, a content item for a private contest 280 without knock to join functionality is shown in the content item 420. As shown, the content item 420 can include similar information to the content item 410, such as the name of the contest, the contest type, the number of friends registered for the contest, a wager amount (e.g., entry fee), a number of entrants, and the contest start time. However, because the contest represented by the content item 420 is not a knock to join contest, the user can merely view the contest and not request authorization to join the contest.

A content item representing a knock to join contest is shown in the content items 430 and 440. As shown in the content item 430, the contest "MLB 50-50 Toss Up" organized by "us-user-8" is a private contest 280 with knock to join functionality. Much like the content items 410 and 420, the content item 430 includes information about the private contest 280, including the name of the contest, the organizer of the contest, the number of friends currently registered for the contest, an entry fee for the contest, the maximum number of registrants for the contest, the contest type, and the contest start time (or registration deadline). In addition, the content item 430 includes the "Knock to Join" actionable object, which when actuated, causes the client device 220 displaying the content item 430 to transmit a knock to join request to the contest system 205, as described herein. Once the knock to join request has been transmitted, the content item 430 can morph into the content item 440, which indicates that the knock to join request has been transmitted, but a response has not yet been received from the organizer of the private contest 280. The content item 440 is substantially similar to the content item 430, but the "Knock to Join" actionable object is replaced with a "Knock Requested" indicator, which indicates that approval to join the contest has not yet been received.

Figure 5:
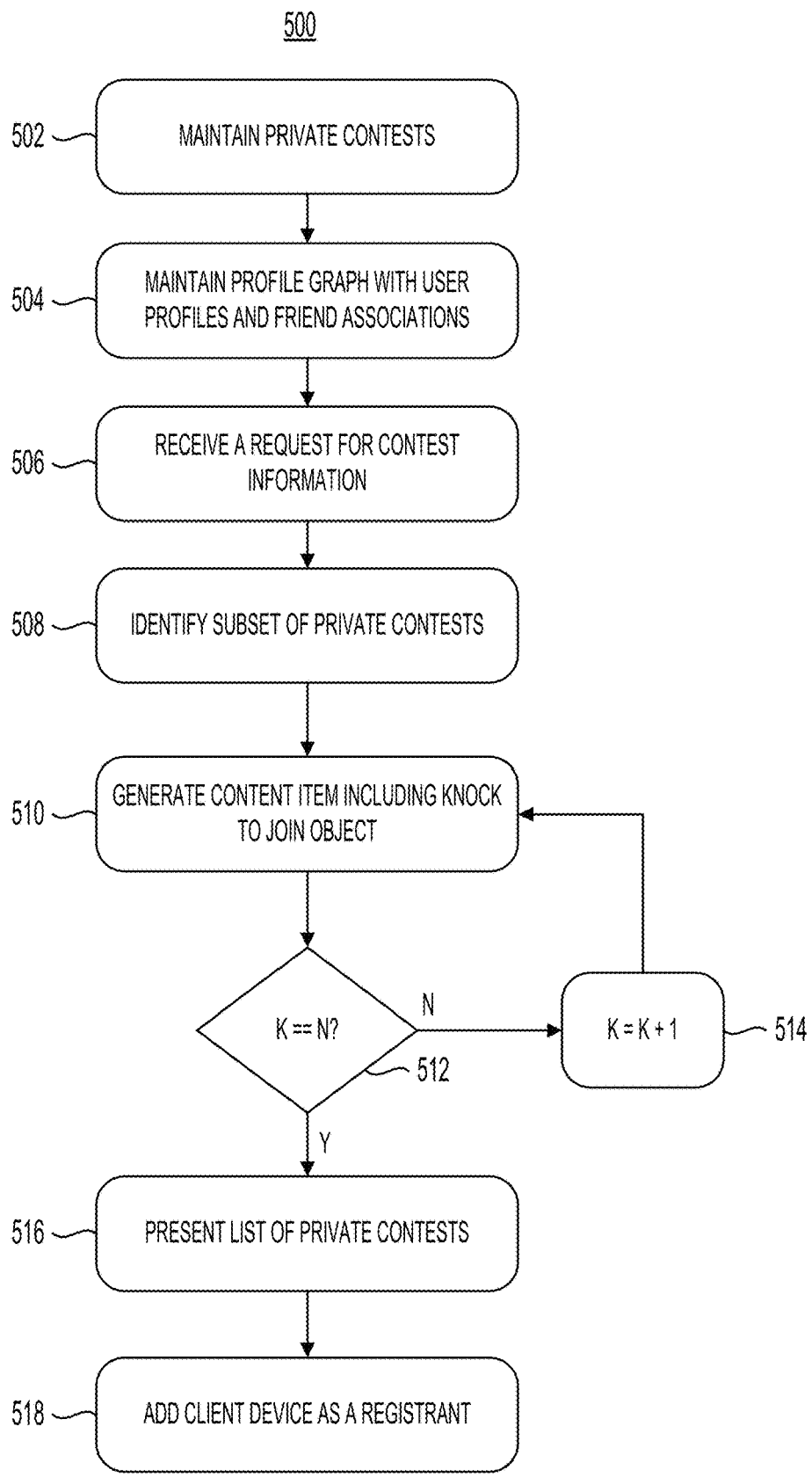
FIG. 5 illustrates an example flow diagram of a method for identifying and providing private contests using a profile graph, in accordance with one or more implementations.

Referring now to FIG. 5, depicted is an illustrative flow diagram of a method 500 for identifying and providing private contests (e.g., the private contests 280) using a profile graph (e.g., the profile graph 270), in accordance with one or more implementations. The method 500 can be executed, performed, or otherwise carried out by the contest system 205, the computer system 100 described herein in conjunction with FIGS. 1A-1D, or any other computing devices described herein. In brief overview of the method 500, the contest system (e.g., the contest system 205, etc.) can maintain one or more private contests (STEP 502), maintain a profile graph including user profiles (e.g., the user profiles 272) and friend associations (e.g., the friend associations 275) (STEP 504), receive a request for contest information (STEP 506), identify a subset of private contests (STEP 506), generate a content item including a knock to join object (STEP 510), determine whether the counter register k is equal to the number of identified private contests n (STEP 512), increment the counter register k (STEP 514), present a list of private contests (STEP 516), and add a client device (e.g., a client device 220) as a registrant (STEP 518).

The contest system can maintain one or more private contests (STEP 502). As described herein, each private contest can identify a registration deadline, a predetermined number of registrants, and an organizer user profile. As described herein, users can access the contest system via an application executing on a client device to create one or more private contests. Maintaining the one or more private contests can include creating private contests in response to requests received from client devices. For example, the contest system can receive a request to create a private contest, which can indicate one or more invitee user profiles. In response to the request, the contest system can create a corresponding private contest in a database (e.g., the database 215) in accordance with private contest parameters specified in the request. If the request specifies one or more invitee user profiles, the contest system can transmit a notification to a client device associated with each invitee user profile. The notification can include an indication to register for the private contest, and can include one or more actionable objects that allow a user to indicate registration in the private contest. In response to an interaction with the actionable object, the corresponding client device can transmit a request to join the private contest. Upon receipt of the request to join, the contest system can store an association between the respective user profile that requested to join the private contest and the private contest.

In some implementations, the contest system can manage the initiation of the private contests. For example, the contest system can monitor the number of registrants for each private contest and the registration deadlines for each private contest. In some implementations, the contest system can initiate a private contest in response to determining that the number of registrants for the private contest is equal to the minimum number of registrants of the private contest at the registration deadline. Initiating the private contest can include, for example, preventing registrants from changing any wagers or fantasy sports lineups related to the private contest, and resolving wagers relating to the private contest according to the rules of the private contest. Likewise, the contest system can also determine if the minimum number of registrants for the private contest is not satisfied at the registration deadline of the private contest. Upon making this determination, the contest system can restrict the private contest from initiation, for example, by canceling the private contest. If the contest system cancels a private contest, the contest system can transmit a notification to each client device associated with each invitee of the private contest.

The contest system can maintain a profile graph including user profiles and friend associations (STEP 504). The profile graph can include one or more user profiles, which can each maintaining one or more friend associations with one or more friend user profiles. Each user profile identified by a friend association can be identified as a friend of a corresponding second user profile identified by the friend association. As described herein, users of the client devices can access the contest system using a respective user profile that identifies the user. Using an application executing on the client device, a user can create a user profile by communicating with the contest system. For example, a user of a client device can interact with one or more user interfaces to provide user information, such as authentication credentials and other identifying user information, into the application on the client device. The client device can transmit a request to create a user profile in the profile graph using the specified user information. The contest system can receive the request and create the user profile by storing the specified user information in the profile graph.

The contest system can further maintain one or friend associations between the user profiles in the profile graph. The friend associations can indicate a mutual relationship between two user profiles. To create a friend association, a client device accessing the contest system using a first user profile can transmit a request to create a friend association with a second user profile. Users accessing the user profile can search for other user profiles, for example, by name or another type of identifier, in the profile graph. In response to a search request for other user profiles contest system can transmit a list of one or more user profiles that the contest system determines is similar (e.g., including similar attributes, contest participation, etc.) to the user profile accessing the contest system. In addition, the contest system can suggest other user profiles that are indicated as friends of user profiles indicated as friends of the first user profile. The client device can select any of these user profiles (e.g., via an interaction, etc.), and transmit a request to create a friend association with the selected second user profile. Upon receiving a request to create a friend association with a second user profile, the contest system can transmit a notification to a client device associated with the second user profile indicating the first user profile requests to create a friend association. The client device of the second user profile can receive approval from a user (e.g., via an interaction, etc.) to accept the friend request, and transmit a message to the contest system approving the friend request. In response to receiving the approval of the friend request, the contest system can create a friend association between the first user profile and the second user profile.

The contest system can receive a request for contest information (STEP 506). The contest system can receive a request for private contest information from a client device associated with a user profile. As described herein, the user profile can maintain one or more friend associations friend user profiles indicated in the friend associations of the user profile. The request for private contest information can be a request for one or more private contests having registrants identified as friends in the friend associations of the user profile. In other words, the request can be a request for a list of private contests that the user's friends are participating in. In some implementations, the request can include filtering criteria, such as a private contest type, a private contest size (e.g., registration count, payout amount, etc.), or other private contest attributes described herein. The request can be transmitted, for example, in response to an interaction with a corresponding user interface element presented in an application executing on the client device associated with the user profile.

The contest system can identify a subset of private contests (STEP 506). Upon receiving the request, the contest system can identify, using the profile graph and from the private contests, a subset of private contests available for registration by the user profile that transmitted the request using the client device. For example, the contest system can identify each private contest that has at least one friend user profile of the requesting user profile (e.g., indicated in the friend associations). In some implementations, to do so, the contest system can iterate through the friend associations of the requesting user profile to identify a set of friend user profiles of the requesting user profile. The contest system can scan through each of the friend user profiles to identify each of the private contests with which each friend user profile is registered. The contest system can de-duplicate, or cluster, each private contest that are identified from the friend user profile. In some implementations, the contest system can identify private contents by first scanning through the registrants of all the private contests in the database and comparing the registrants to the list of friend user profiles indicated in the friend associations of the requesting user profile. As described herein, the contest system can identify private contests that are upcoming (e.g., the registration deadline has not passed, the private contest has not been canceled, etc.).

In some implementations, the contest system can identify the private contests available for registration by the first user profile further by filtering the private contests by registration deadline. For example, the contest system can implement filtering policy to exclude private contests that are expiring very soon (e.g., within a minute, within thirty seconds, within fifteen seconds, within five seconds, etc.). In this way, the contest system can prevent the display or retrieval of private contests that cannot practically be joined by the user making the request for private contest information. Other filtering criteria are also possible, in some implementations, in combination with registration deadline based filtering or any other filtering techniques described herein for private contests.

In some implementations, the contest system can identify the private contests available for registration by the requesting user profile by filtering the private contests according to the number of registrants of each private contest compared to the minimum number of registrants required for the private contest initiate, following identifying the private contests has having friends as registrants. For example, the contest system can filter the private contests to those that require only a few (e.g., one, two, three, etc.) additional participants to meet the required minimum number of participants for the private contest. In doing so, the contest system can cause private contests which are close to meeting their minimum registration deadlines to requesting users, making these private contests more likely to satisfy their registration requirements. In some implementations, the contest system can filter the private contests those that only have a few participants (e.g., one, two, three, etc), following identifying the private contests has having friends as registrants.

In some implementations, the contest system identify the private contests from the friend user profiles based on a correspondence between attributes of the private contest and attributes of the requesting user profile. For example, the requesting user profile can indicate contest preference information, such as a historic record of types of private or public contests that the user profile has registered for. In some implementations, the user profiles can indicate an average wager amount for different types of contests, including previously completed private contests. The contest system can compare the attributes of each private contest (e.g., the wager amount, contest type, etc.) to the historic records of the requesting user profile. The contest system can identify the private contests that have similar attributes (e.g., same type, wager requirements within a predetermined threshold similarity range, a number of registrants within a predetermined threshold similarity range, a payout within a predetermined threshold similarity range, etc.) to the private contests that included the requesting user profile as a registrant.

The contest system can generate a content item including a knock to join object (STEP 510). Once the subset of private contests has been identified from the friend user profiles, the contest system can generate a content item for each private contest. To do so, the contest system can select a private contest from the subset of private contests according to the counter register k. If this is the first iteration of the loop, the contest system can select the first private contest of the subset, and set the counter register to an initialization value (e.g., zero, one, etc.). If the selected private contest includes knock to join functionality, the contest system can generate a content item for the private contest that includes a knock to join actionable object. The knock to join actionable object, when actuated via user input on a client device, can cause the client device to request to join the private contest. The content item can include information about the private contest, such as the number of registrants for the private contest, a minimum number of registrants for the private contest, a maximum number of registrants for the private contest, the type of the private contest, a number of friend user profiles that are registered for the private contest, wagering information (e.g., a payout amount, a minimum wager amount, a maximum wager amount, etc.), and indications of one or more friend user profiles that are enrolled in the private contest. If the private contest does not have knock to join functionality, the content item may not include a knock to join actionable object, and can instead display an indication that the corresponding private contest is private and cannot be joined by user profiles not designated as invitees. Generating a content item can include generating one or more data structures including instructions or metadata, that when interpreted or executed by the application executing on the client device, cause the application to display the content item, which can include the actionable objects or user interface elements described herein.

The contest system can determine whether the counter register k is equal to the number of identified private contests n (STEP 512). To determine whether a content item has been generated for each private contest, the contest system can compare the counter register k used to track the number of generated content items to the total number of identified private contests n. If the counter register k is not equal to (e.g., less than) the total number of identified private contests n, the contest system can execute (STEP 514). If the counter register k is equal to (e.g., equal to or greater than) the total number of identified private contests n, the contest system can execute (STEP 516).

The contest system can increment the counter register k (STEP 514). To track the total number of generated content items, the contest system can add one to the counter register k to indicate the number of content items that have been generated by the contest system. After incrementing the value of the counter register k, the educational content system can execute (STEP 510).

The contest system can present a list of private contests (STEP 516). Once the content items are generated, the contest system can generate a list of private contests that includes each generated content item for each identified private contest from the friend user profiles. The list of private contests can be, for example, instructions or metadata that cause a client device to render one or more of the generated content items in an application executing on the client device. The list of private contests can be stored, for example, in a database in association with the user profile that made the request for the private contest information. In some implementations, the list of private contests can indicate an order of the private contests. To determine the order of the list of private contests, the contest system can sort the list of private contests according to various criteria.

In some implementations, the contest system can sort the list of private contests according to the number of friend user profiles indicated as registrants for the private contests. For example, the private contests having the largest number of friend user profiles as registrants can be positioned at the top of the list, while the private contests having the fewest number of friend user profiles as registrants can be positioned at the bottom of the list. In some implementations, contests positioned at the top of the list of private contests can be displayed to the user first (e.g., at the top of the display of the application), and so on until the bottom of the list. Other sorting criteria are also possible. For example, the contest system can sort the list of private contests by wager amount, maximum number of registrants, payout amount, contest name (e.g., alphabetical order, reverse alphabetical order, etc.), contest type, or any other attribute of a private contest. In some implementations, sorting the list of private contests can take place on the client device. For example, the contest system can generate the list of private contests with instructions or metadata that causes a client device displaying the list of private contests to display the list of private contests in a particular order. In some implementations, the instructions or metadata can cause the client device to display one or more actionable objects that allow a user to sort the list of private contest at the client device according to one or more selected sorting criteria.

Upon generating the list of private contests, the contest system can present the list of private contests on a display of the client device that transmitted the request for private contest information. As described herein, the display of the list of private contests can include one or more of the content items generated for each private contest identified by the contest system (e.g., those that correspond to friend user profiles indicated in the friend associations of the requesting user profile). To do so, the contest system can transmit the list of private contests, which includes the content items generated by the contest system, to the client device that transmitted the request for the private contest information. As described herein, the list of private contests can include instructions or metadata that when executed or interpreted by the application executing on the client device, cause the application to present the list of private contests in one or more user interfaces. In some implementations, a user of the client device can interact with the application, for example, by preforming one or more swipe motions, to scroll through the list of private contests (e.g., the list of content items corresponding to each private contest, etc.). An example interface that displays a list of private contests is described in greater detail herein in connection with FIGS. 3 and 4. A user of the client device can interact with actionable objects in one or more of the content items to transmit a knock to join request for a private contest to the contest system, as described herein.

The contest system can add the client device as a registrant (STEP 518). As described herein, the client device can transmit a knock to join request that identifies a private contest to the contest system, which can transmit a notification of the join request to the organizer of the indicated private contest. The client device of the organizer, in response to an interaction with the notification, can transmit an authorization message to the contest system that authorizes the requesting user profile to register for the private contest. The contest system can then transmit a notification to the client device that provide the knock to join request, which can display an actionable object that allows the user of the client device to register for the private contest. In response to an interaction with the actionable object, the client device can transmit a request to register for the private contest to the contest system.

The contest system can add the client device as a registrant for the private contest, in response to receiving a request to register for a private contest. The private contest can be a knock to join private contest, which the organizer of the private contest authorized the requesting user profile to register. In some implementations, the request to register for the private contest can specify contest entrant information, including an identification of the requesting user profile, and wagering information, such as a wager amount, fantasy sports information, a selection of one or more possible contest outcomes, or any other wager-related information. To register a user profile for the private contest, the contest system can store an association between the private contest and the user profile, and increment the total participant count. In addition, if the contest involves a wager that specifies an amount of credits, or a payment amount, the contest system can remove the credits or the payment amount from the user profile and add the credits or the payment amount to the private contest in accordance with the rules of the private contest.

It should be understood that the techniques of the present disclosure can be applied to a variety of environments in which private data objects are shared or accessed. At least one aspect of the present disclosure is directed to a method. The method can be performed, for example, by one or more processors coupled to memory. The method can include maintaining a plurality of private contests. Each private contest can identify a registration deadline, a predetermined number of registrants, and an organizer profile of the private contest. The method can include maintaining a profile graph comprising a plurality of user profiles. Each user profile of the plurality of user profiles can maintain an association with one or more friend user profiles. Each friend user profile of the one or more friend user profiles can be identified as a friend of the user profile. The method can include receiving, from a client device associated with a first user profile of the plurality of user profiles, a request for contest information. The method can include identifying, using the profile graph, from the plurality of private contests, a subset of private contests available for registration by the first user profile. Each private contest of the subset can include, as a registrant, at least one friend user profile associated with the first user profile. The method can include generating, responsive to identifying the subset of private contests, for each private contest of the subset of private contests, a content item including a knock to join actionable object, which when actuated, causes the client device to request to join the private contest. The method can include presenting, to the client device, a list of private contests comprising the content item for each private contest of the subset of private contests. The method can include adding, responsive to receiving a request from the client device upon actuation of the actionable object corresponding to a private contest, the client device as a registrant for the private contest.

In some implementations, the method can include transmitting, to a second client device associated with the organizer profile of the private contest, a join notification identifying the private contest, the first user profile, and the at least one friend user profile associated with the private contest and the first user profile. In some implementations, the method can include receiving, from the second client device, responsive to the join notification, an indication to allow the first user profile to register for the private contest. In some implementations, adding the client device as the registrant for the private contest is further responsive to the indication to allow the first user profile to register for the private contest.

In some implementations, the indication to allow the first user profile to register for the private contest comprises an indication to allow the first user profile to register for a second subset of the plurality of private contests. In some implementations, each private contest of the second subset of the plurality of private contests can identify the organizer profile. In some implementations, the method can include authorizing the first user profile to register for each private contest of the second subset of the plurality of private contests. In some implementations, the method can include generating the list of private contests comprising the content item for each private contest of the subset of private contests.

In some implementations, the method can include sorting, by the one or more processors, the list of private contests based on a number of registrants of each private contest in the list of private contests that are indicated as a friend user profile of the one or more friend user profiles associated with the first user profile. In some implementations, identifying the subset of private contests available for registration by the first user profile can include filtering the plurality of private contests based on the registration deadline of each private contest of the plurality of private contests. In some implementations, identifying the subset of private contests available for registration by the first user profile can include filtering the plurality of private contests by comparing a number of registrants of each private contest of the plurality of private contests to the predetermined number of registrants of the private contest.

In some implementations, identifying the subset of private contests is further based on a correspondence between attributes of the contest and the first user profile. In some implementations, the method can include determining that the predetermined number of registrants for the private contest is satisfied at the registration deadline of the private contest. In some implementations, the method can include initiating the private contest responsive to determining the predetermined number of registrants is satisfied at the registration deadline. In some implementations, the method can include determining that the predetermined number of registrants for the private contest is not satisfied at the registration deadline of the private contest. In some implementations, the method can include restricting the private contest from initiation responsive to determining the predetermined number of registrants is not satisfied at the registration deadline.

At least one other aspect of the present disclosure is directed to a system. The system can include one or more processors coupled to memory. The system can maintain a plurality of private contests. Each private contest can identify a registration deadline, a predetermined number of registrants, and an organizer profile of the private contest. The system can maintain a profile graph comprising a plurality of user profiles. Each user profile of the plurality of user profiles can maintain an association with one or more friend user profiles. Each friend user profile of the one or more friend user profiles can be identified as a friend of the user profile. The system can receive, from a client device associated with a first user profile of the plurality of user profiles, a request for contest information. The system can identify, using the profile graph, from the plurality of private contests, a subset of private contests available for registration by the first user profile. Each private contest of the subset including, as a registrant, at least one friend user profile associated with the first user profile. The system can generate, responsive to identifying the subset of private contests, for each private contest of the subset of private contests, a content item including a knock to join actionable object, which when actuated, causes the client device to request to join the private contest. The system can present, to the client device, a list of private contests comprising the content item for each private contest of the subset of private contests. The system can add, responsive to receiving a request from the client device upon actuation of the actionable object corresponding to a private contest, the client device as a registrant for the private contest.

In some implementations, the system can transmit, to a second client device associated with the organizer profile of the private contest, a join notification identifying the private contest, the first user profile, and the at least one friend user profile associated with the private contest and the first user profile. In some implementations, the system can receive, from the second client device, responsive to the join notification, an indication to allow the first user profile to register for the private contest. In some implementations, adding the client device as the registrant for the private contest is further responsive to the indication to allow the first user profile to register for the private contest. In some implementations, the indication to allow the first user profile to register for the private contest comprises an indication to allow the first user profile to register for a second subset of the plurality of private contests. In some implementations, each private contest of the second subset of the plurality of private contests identifying the organizer profile. In some implementations, the system can authorize the first user profile to register for each private contest of the second subset of the plurality of private contests.

In some implementations, the one or more processors are further configured to generate the list of private contests comprising the content item for each private contest of the subset of private contests. In some implementations, the system can sort the list of private contests based on a number of registrants of each private contest in the list of private contests that are indicated as a friend user profile of the one or more friend user profiles associated with the first user profile. In some implementations, the system can identify the subset of private contests available for registration by the first user profile further based on filtering the plurality of private contests based on the registration deadline of each private contest of the plurality of private contests.

In some implementations, the system can identify the subset of private contests available for registration by the first user profile further based on filtering the plurality of private contests by comparing a number of registrants of each private contest of the plurality of private contests to the predetermined number of registrants of the private contest. In some implementations, the system can identify the subset of private contests further based on a correspondence between attributes of the contest and the first user profile. In some implementations, the system can determine that the predetermined number of registrants for the private contest is not satisfied at the registration deadline of the private contest. In some implementations, the system can restrict the private contest from initiation responsive to determining the predetermined number of registrants is not satisfied at the registration deadline.

At least one other aspect of the present disclosure is directed to a method. The method can be performed, for example, by one or more processors coupled to memory. The method can include maintaining a profile graph comprising a plurality of user profiles, each user profile maintaining an association with one or more friend user profiles each friend user profile identified as a friend of the user profile. The method can include maintaining a plurality of private contests, each private contest identifying a registration deadline, a predetermined number of registrants, and an organizer of the private contest. The method can include receiving, from a first client device associated with a first user profile of the plurality of user profiles, a request for contest information. The method can include identifying, from the plurality of private contests, a subset of private contests available for registration by the first user profile, each private contest of the subset including, as a registrant, at least one friend user profile associated with the first user profile. The method can include transmitting the subset of private contests to the first client device, the first client device configured to present, for each private contest, a content item including one or more identifiers identifying one or more friend user profiles associated with the first user profile that are registered for the private contest. The method can include receiving a first request to join a first private contest of the subset of private contests. The method can include transmitting, to a second client device corresponding to a second user profile identified as the organizer of the first private contest, a second request identifying the first user profile and one or more third user profiles that are friends of the first user profile that are registered for the first private contest. The method can include adding the first user profile as a registrant to the first private contest responsive to receiving, from the second client device, a response to the second request. The method can include initiating the first private contest responsive to determining, at a first registration deadline of the first private contest, that a number of registrants of the first private contest is equal to the predetermined number of registrants for the first private contest; or restricting the first private contest from initiation responsive to determining at the first registration deadline of the first private contest, that the number of registrants is less than the predetermined number of registrants for the first private contest.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the contest system 205 can include clients and servers. For example, the contest system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the contest system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for identifying and providing private contests using a profile graph, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
   maintaining, by one or more processors coupled to memory, a node graph comprising a plurality of nodes, each node of the plurality of nodes maintaining an association with one or more neighbor nodes;
   maintaining, by the one or more processors, a plurality of private data objects, each private data object (i) generated in response to a request associated with an organizer node, (ii) including a list of authorized nodes, and (iii) comprising a setting to enable the one or more neighbor nodes of each of the list of authorized nodes to request inclusion in the list of authorized nodes;
   receiving, by the one or more processors, from a client device associated with a first node of the plurality of nodes, a request for private data objects;
   identifying, by the one or more processors, using the node graph, from the plurality of private data objects, a subset of private data objects that include, in the list of authorized nodes, at least one of the one or more neighbor nodes of the first node;
   generating, by the one or more processors, responsive to identifying the subset of private data objects, for each private data object of the subset of private data objects, a content item including an actionable object, which when actuated, causes the client device to transmit a request to include the first node in the list of authorized nodes of the private data object;
   presenting, by the one or more processors, to the client device, a list of private data objects comprising the content item for each private data object of the subset of private data objects; and
   subsequent to receiving a request from the client device upon actuation of the actionable object corresponding to a private data object, adding, by the one or more processors, the first node to the list of authorized nodes of the private data object.

2. The method of claim 1, further comprising:
   transmitting, by the one or more processors to a second client device associated with the organizer node of the private data object, a join notification identifying the private data object, the first node, and the at least one of the one or more neighbor nodes of the first node;
   receiving, by the one or more processors from the second client device, responsive to the join notification, an indication to allow the first node to access the private data object; and
   wherein adding the first node to the list of authorized nodes of the private data object is responsive to the indication to allow the first node to access the private data object.

3. The method of claim 2, wherein the indication to allow the first node to access the private data object comprises an indication to allow the first node to access a second subset of the plurality of private data objects, each private data object of the second subset of the plurality of private data objects identifying the organizer node as an organizer; and
authorizing, by the one or more processors, the first node to access each private data object of the second subset of the plurality of private data objects.

4. The method of claim 1, further comprising generating, by the one or more processors, the list of private data objects comprising the content item for each private data object of the subset of private data objects.

5. The method of claim 1, further comprising sorting, by the one or more processors, the list of private data objects based on a number of the one or more neighbor nodes of the first node that are included in the list of authorized nodes of each private data object in the list of private data objects.

6. The method of claim 1, wherein identifying the subset of private data objects further comprises filtering the plurality of private data objects based on a time period associated with each private data object of the plurality of private data objects.

7. The method of claim 1, wherein identifying the subset of private data objects further comprises filtering the plurality of private data objects by comparing a number of the plurality of nodes that are authorized to access each private data object of the plurality of private data objects to a predetermined number of authorized nodes of the private data object.

8. The method of claim 1, wherein identifying the subset of private data objects is further based on a correspondence between attributes of each private data object of the subset of private data objects and the first node.

9. The method of claim 1, further comprising:
determining, by the one or more processors, that a predetermined number of authorized nodes of the private data object is satisfied at a time period associated with the private data object; and
initiating, by the one or more processors, the private data object responsive to determining the predetermined number of authorized nodes is satisfied at the time period.

10. The method of claim 1, further comprising:
determining, by the one or more processors, that a predetermined number of authorized nodes of the private data object is not satisfied at a time period associated with the private data object; and
restricting, by the one or more processors, the private data object from initiation responsive to determining the predetermined number of authorized nodes is not satisfied at the time period.

11. A system, comprising:
one or more processors coupled to memory, the one or more processors configured to:
maintain a node graph comprising a plurality of nodes, each node of the plurality of nodes maintaining an association with one or more neighbor nodes;
maintain a plurality of private data objects, each private data object (i) generated in response to a request associated with an organizer node, (ii) including a list of authorized nodes, and (iii) comprising a setting to enable the one or more neighbor nodes of each of the list of authorized nodes to request inclusion in the list of authorized nodes;
receive, from a client device associated with a first node of the plurality of nodes, a request for private data objects;
identify, using the node graph, from the plurality of private data objects, a subset of private data objects that include, in the list of authorized nodes, at least one of the one or more neighbor nodes of the first node;
generate, responsive to identifying the subset of private data objects, for each private data object of the subset of private data objects, a content item including an actionable object, which when actuated, causes the client device to transmit a request to include the first node in the list of authorized nodes of the private data object;
present, to the client device, a list of private data objects comprising the content item for each private data object of the subset of private data objects; and
add the first node to the list of authorized nodes of the private data object subsequent to receiving a request from the client device upon actuation of the actionable object corresponding to a private data object.

12. The system of claim 11, wherein the one or more processors are further configured to:
transmit, to a second client device associated with the organizer node of the private data object, a join notification identifying the private data object, the first node, and the at least one of the one or more neighbor nodes of the first node;
receive, from the second client device, responsive to the join notification, an indication to allow the first node to access the private data object; and
wherein the one or more processors are further configured to add the first node to the list of authorized nodes of the private data object responsive to the indication to allow the first node to access the private data object.

13. The system of claim 12, wherein the indication to allow the first node to access the private data object comprises an indication to allow the first node to access a second subset of the plurality of private data objects, each private data object of the second subset of the plurality of private data objects identifying the organizer node as an organizer; and
wherein the one or more processors are further configured to authorize the first node to access each private data object of the second subset of the plurality of private data objects.

14. The system of claim 11, wherein the one or more processors are further configured to generate the list of private data objects comprising the content item for each private data object of the subset of private data objects.

15. The system of claim 11, wherein the one or more processors are further configured to sort the list of private data objects based on a number of the one or more neighbor nodes of the first node that are included in the list of authorized nodes of each private data object in the list of private data objects.

16. The system of claim 11, wherein the one or more processors are further configured to identify the subset of private data objects by performing operations comprising filtering the plurality of private data objects based on a time period associated with each private data object of the plurality of private data objects.

17. The system of claim 11, wherein the one or more processors are further configured to identify the subset of private data objects by performing operations comprising filtering the plurality of private data objects by comparing a number of the plurality of nodes that are authorized to access each private data object of the plurality of private data objects to a predetermined number of authorized nodes of the private data object.

18. The system of claim 11, wherein the one or more processors are further configured to identify the subset of private data objects further based on a correspondence between attributes of each private data object of the subset of private data objects and the first node.

19. The system of claim 11, wherein the one or more processors are further configured to:
   determine that a predetermined number of authorized nodes of the private data object is satisfied at a time period associated with the private data object; and
   initiate the private data object responsive to determining the predetermined number of authorized nodes is satisfied at the time period.

20. The system of claim 11, further comprising:
   determine that a predetermined number of authorized nodes of the private data object is not satisfied at a time period associated with the private data object; and
   restrict the private data object from initiation responsive to determining the predetermined number of authorized nodes is not satisfied at the time period.

* * * * *